US011948522B2

United States Patent
Sako et al.

(10) Patent No.: US 11,948,522 B2
(45) Date of Patent: Apr. 2, 2024

(54) DISPLAY DEVICE WITH LIGHT ADJUSTMENT FOR DIVIDED AREAS USING AN ADJUSTMENT COEFFICIENT

(71) Applicant: Japan Display Inc., Tokyo (JP)

(72) Inventors: Kazuhiko Sako, Tokyo (JP); Tsutomu Harada, Tokyo (JP)

(73) Assignee: Japan Display Inc., Tokyo (JP)

(*) Notice: Subject to any disclaimer, the term of this patent is extended or adjusted under 35 U.S.C. 154(b) by 182 days.

(21) Appl. No.: 17/476,857

(22) Filed: Sep. 16, 2021

(65) Prior Publication Data

US 2022/0005420 A1 Jan. 6, 2022

Related U.S. Application Data

(63) Continuation of application No. PCT/JP2020/012397, filed on Mar. 19, 2020.

(30) Foreign Application Priority Data

Mar. 19, 2019 (JP) .................. 2019-051813

(51) Int. Cl.
*G09G 3/34* (2006.01)
*G09G 3/36* (2006.01)

(52) U.S. Cl.
CPC .............. *G09G 3/342* (2013.01); *G09G 3/36* (2013.01); *G09G 2300/0452* (2013.01); *G09G 2320/0233* (2013.01); *G09G 2360/16* (2013.01)

(58) Field of Classification Search
CPC ............ G09G 3/34-3426; G09G 3/36; G09G 3/3611; G09G 3/3648; G09G 3/3666;
(Continued)

(56) References Cited

U.S. PATENT DOCUMENTS 7,176,878 B2 * 2/2007 Lew .................. G09G 3/3406
345/207
2008/0111784 A1 * 5/2008 Tanaka ................ G09G 3/342
345/102
(Continued)

FOREIGN PATENT DOCUMENTS

CN 108447449 A 8/2018
JP 2008051905 A 3/2008
(Continued)

OTHER PUBLICATIONS

International Search Report in Application No. PCT/JP2020/012397, dated Jun. 2, 2020.

*Primary Examiner* — Keith L Crawley
(74) *Attorney, Agent, or Firm* — K&L Gates LLP

(57) ABSTRACT

According to an aspect, a display device includes: an image display panel having an image display surface on which display is to be controlled based on an image signal; a light source device that includes light sources provided corresponding to divided partial areas of the image display surface, and is configured to illuminate the image display surface; and a signal processor configured to calculate a light quantity of each light source for each of the partial areas. The signal processor is configured to calculate the light quantity for each partial area based on the image signal, set one of the partial areas as an adjustment target partial area for the light quantity, and adjust the light quantity in the adjustment target partial area when the light quantity of an adjacent partial area located around the adjustment target partial area is equal to or smaller than a predetermined value.

30 Claims, 21 Drawing Sheets

(58) Field of Classification Search
CPC ... G09G 2320/0233; G09G 2320/0238; G09G 2320/0285; G09G 2320/0626–066; G09G 2320/0686; G09G 2330/021; G09G 2360/16; G02F 1/1336–133601
See application file for complete search history.

(56) References Cited

U.S. PATENT DOCUMENTS

| | | | | |
|---|---|---|---|---|
| 2009/0140975 A1* | 6/2009 | Nonaka | ............... | G09G 3/3426 345/102 |
| 2010/0110112 A1* | 5/2010 | Nakanishi | ............ | G09G 3/3426 345/690 |
| 2011/0122168 A1* | 5/2011 | Lee | ..................... | G09G 3/3426 345/102 |
| 2011/0169873 A1* | 7/2011 | Sano | ................... | G09G 3/3611 345/102 |
| 2012/0105507 A1 | 5/2012 | An et al. | | |
| 2012/0139885 A1 | 6/2012 | Iwasa et al. | | |
| 2012/0268350 A1* | 10/2012 | Yoshimura | ........... | G09G 3/3426 345/1.3 |
| 2012/0268505 A1* | 10/2012 | Tani | ......................... | G09G 5/10 345/694 |
| 2015/0235597 A1* | 8/2015 | Meng | .................... | G02F 1/1336 345/102 |
| 2016/0322005 A1* | 11/2016 | Umeyama | ............ | G09G 3/3426 |
| 2018/0061330 A1* | 3/2018 | Jeon | ...................... | G09G 3/342 |
| 2018/0268781 A1* | 9/2018 | Park | ...................... | G09G 5/10 |
| 2019/0108797 A1* | 4/2019 | Zhang | ................ | G09G 3/3426 |
| 2019/0206335 A1* | 7/2019 | Wu | ..................... | G09G 3/3426 |
| 2019/0221167 A1 | 7/2019 | Lin | | |

FOREIGN PATENT DOCUMENTS

| | | |
|---|---|---|
| JP | 2012123100 A | 6/2012 |
| JP | 2012226178 A | 11/2012 |

* cited by examiner

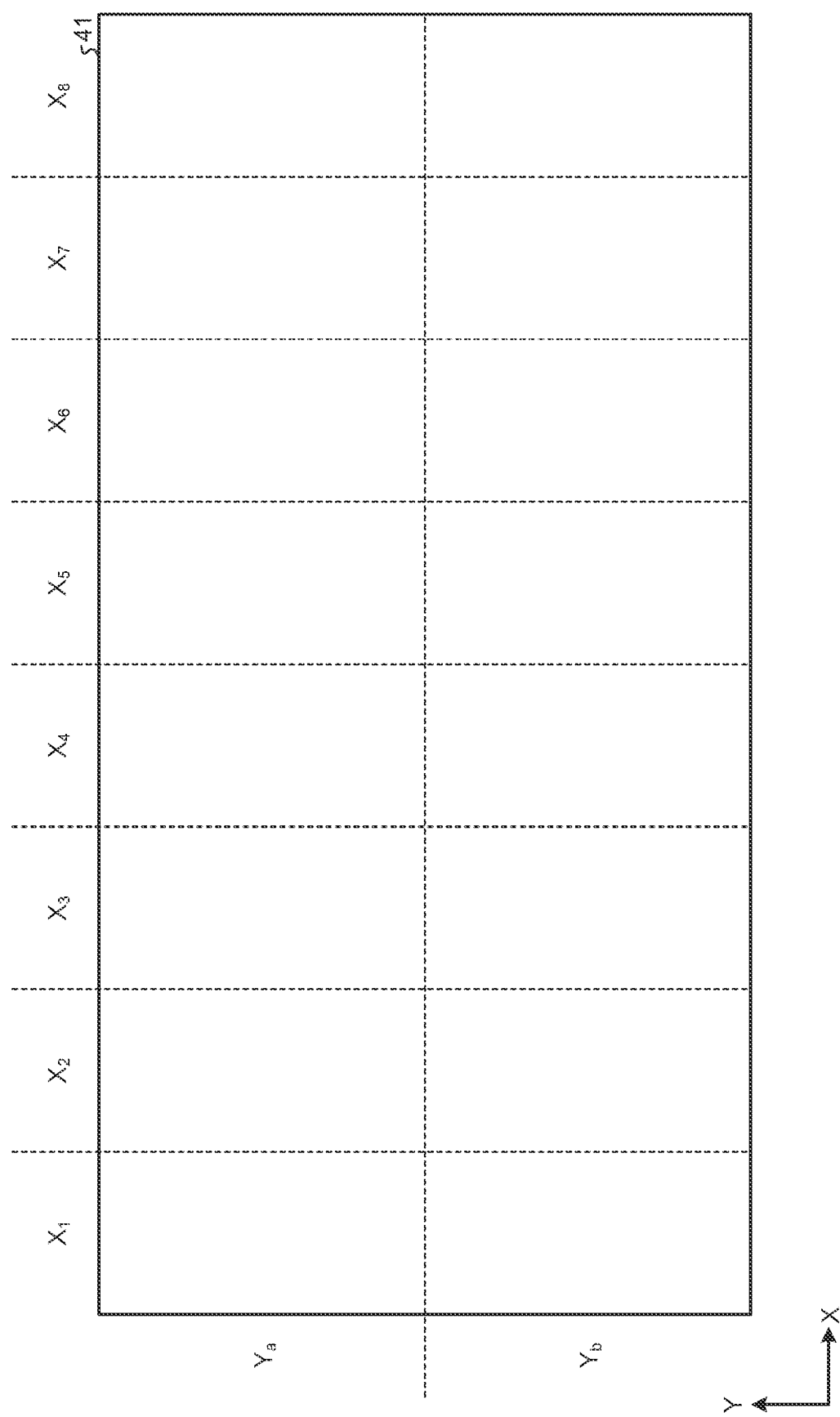

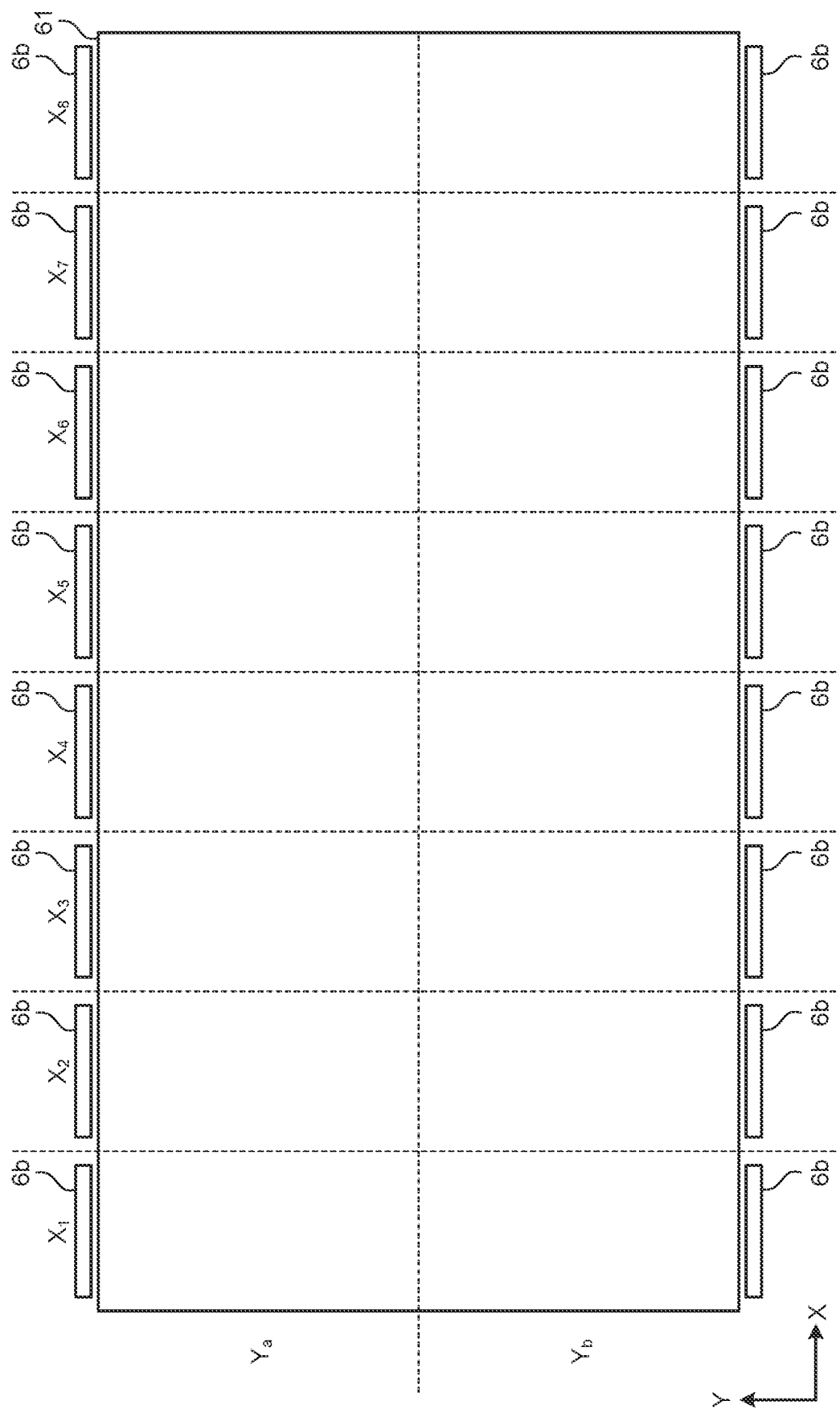

DISPLAY DEVICE WITH LIGHT ADJUSTMENT FOR DIVIDED AREAS USING AN ADJUSTMENT COEFFICIENT

CROSS-REFERENCE TO RELATED APPLICATION

This application claims the benefit of priority from Japanese Patent Application No. 2019-051813 filed on Mar. 19, 2019 and International Patent Application No. PCT/JP2020/012397 filed on Mar. 19, 2020, the entire contents of which are incorporated herein by reference.

BACKGROUND

1. Technical Field

What is disclosed herein relates to a display device.

2. Description of the Related Art

Display devices have been known that have a local dimming function in which a light source device such as a backlight is divided into a plurality of areas, and light emission of a light source is controlled for each of the divided areas according to a video signal for the area. When such a display device displays an image in which high-luminance areas are mixed with low-luminance areas, a phenomenon called "black floating" may occur in which light sources disposed in the high-luminance areas brighten the low-luminance areas around the high-luminance areas. This phenomenon is known as what is called a "halo effect".

A technique (for example, Japanese Patent Application Laid-open Publication No. 2012-226178) has been disclosed to display the above-described image including the high-luminance areas mixed with the low-luminance areas without giving an uncomfortable impression by, for example, adjusting the light quantity of the light sources in the low-luminance areas around the high-luminance areas.

Using the above-described technique reduces the uncomfortable impression in the low-luminance areas, but reduces contrast to the high-luminance areas. In addition, a problem is present that no effect can be expected to reduce what is called the black floating due to the halo effect.

SUMMARY

According to an aspect, a display device includes: an image display panel having an image display surface on which display is to be controlled based on an image signal; a light source device that includes a plurality of light sources provided corresponding to a plurality of divided partial areas of the image display surface, and is configured to illuminate the image display surface; and a signal processor configured to calculate a light quantity of each light source for each of the partial areas. The signal processor is configured to calculate the light quantity for each partial area based on the image signal, set one of the partial areas as an adjustment target partial area for the light quantity, and adjust the light quantity in the adjustment target partial area when the light quantity of an adjacent partial area located around the adjustment target partial area is equal to or smaller than a predetermined value.

According to an aspect, a display device includes: an image display panel having an image display surface on which display is to be controlled based on an image signal; a light source device that includes a plurality of light sources provided corresponding to a plurality of divided partial areas of the image display surface, and is configured to illuminate the image display surface; and a signal processor configured to calculate a light quantity of each light source for each of the partial areas. The signal processor is configured to calculate the light quantity for each partial area based on the image signal, set one of the partial areas as an adjustment target partial area for the light quantity, and adjust the light quantity in the adjustment target partial area when a difference value obtained by subtracting the light quantity of an adjacent partial area located around the adjustment target partial area from the light quantity of the adjustment target partial area is equal to or smaller than a predetermined value.

According to an aspect, a display device includes: an image display panel having an image display surface on which display is to be controlled based on an image signal; a light source device that includes a plurality of light sources provided corresponding to a plurality of divided partial areas of the image display surface, and is configured to illuminate the image display surface; and a signal processor configured to calculate a light quantity of each light source for each of the partial areas. The signal processor is configured to calculate the light quantity for each partial area based on the image signal, set one of the partial areas as an adjustment target partial area for the light quantity, and adjust the light quantity in the adjustment target partial area when the light quantity of an adjacent partial area located around the adjustment target partial area is equal to or smaller than a predetermined value, or when a difference value obtained by subtracting the light quantity of an adjacent partial area located around the adjustment target partial area from the light quantity of the adjustment target partial area is equal to or smaller than a predetermined value.

According to an aspect, a display device includes: an image display panel configured to display an image based on an image signal; and a light source device having a first divided area and a second divided area adjacent to the first divided area that face an image display surface of the image display panel. The image display panel is configured to calculate a light quantity of the first divided area and a light quantity of the second divided area based on the image signals, and reduce the light quantity of the first divided area when the light quantity of the second divided area is equal to or smaller than a predetermined value.

According to an aspect, a display device includes: an image display panel configured to display an image based on an image signal; and a light source device having a first divided area and a second divided area adjacent to the first divided area that face an image display surface of the image display panel. The image display panel is configured to calculate a light quantity of the first divided area and a light quantity of the second divided area based on the image signals, and reduce the light quantity of the first divided area when the light quantity of the first divided area is larger than the light quantity of the second divided area by a predetermined value or more.

According to an aspect, a display device includes: an image display panel configured to display an image based on an image signal; and a light source device having a first divided area and a second divided area adjacent to the first divided area that face an image display surface of the image display panel. The image display panel is configured to calculate a light quantity of the first divided area and a light quantity of the second divided area based on the image signals, and reduce the light quantity of the first divided area when the light quantity of the second divided area is equal to or smaller than a predetermined value, or when the light quantity of the first divided area is larger than the light quantity of the second divided area by a predetermined value or more.

BRIEF DESCRIPTION OF THE DRAWINGS

FIG. 19 is a schematic diagram illustrating the image display surface of the display device according to a third embodiment of the present disclosure; and FIG. 20 is a diagram illustrating the light-emitting area according to the third embodiment.

DETAILED DESCRIPTION

Figure 1:
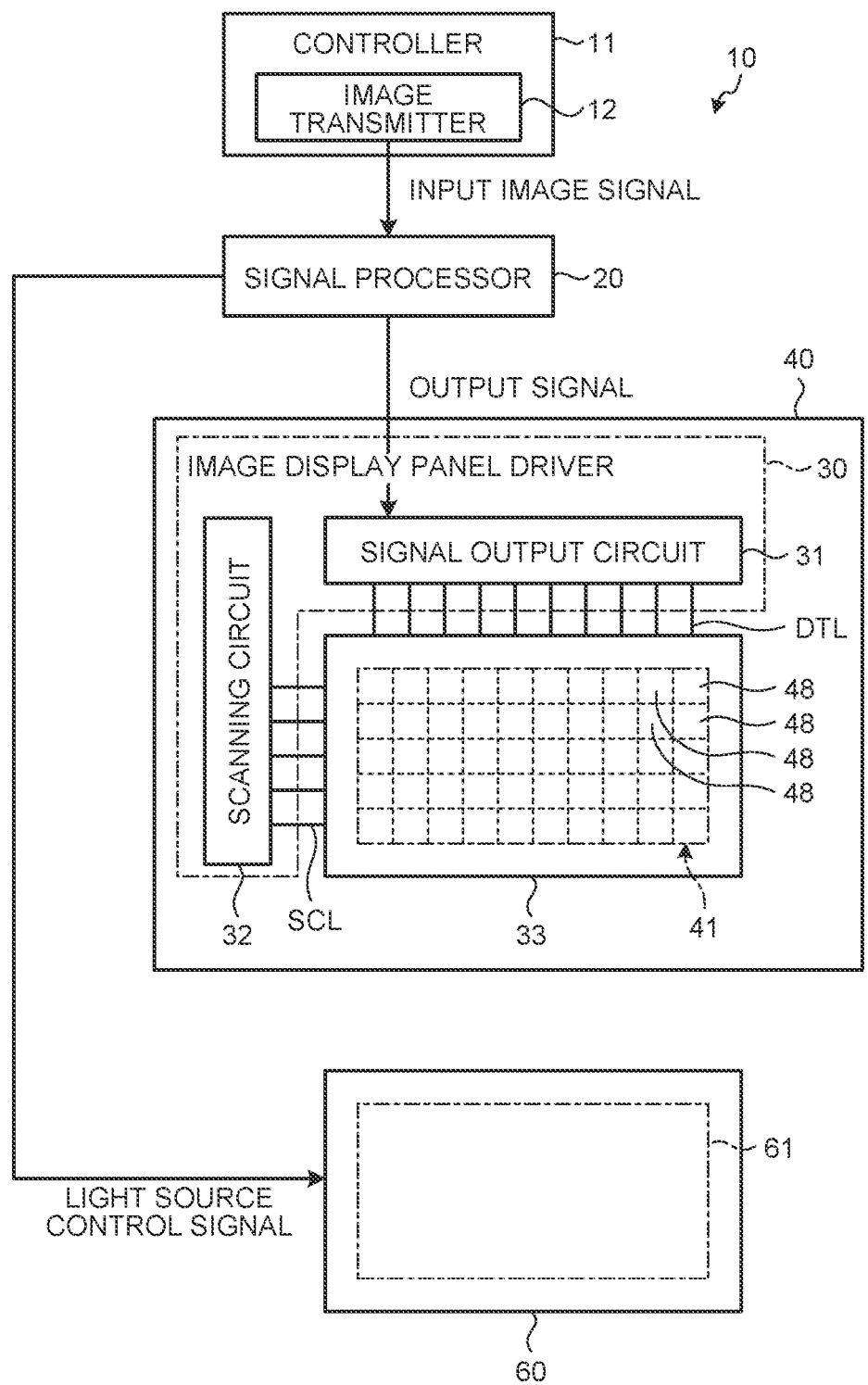
FIG. 1 is a block diagram illustrating an exemplary configuration of a display device according to a first embodiment of the present disclosure.

The following describes modes (embodiments) for carrying out the present disclosure in detail with reference to the drawings. The present disclosure is not limited to the description of the embodiments given below. Components described below include those easily conceivable by those skilled in the art or those substantially the same. Moreover, the components described below can be combined as appropriate. What is disclosed herein is merely an example, and the present disclosure naturally encompasses appropriate modifications easily conceivable by those skilled in the art while maintaining the gist of the disclosure. To further clarify the description, the drawings schematically illustrate, for example, widths, thicknesses, and shapes of various parts as compared with actual aspects thereof, in some cases. However, they are merely examples, and interpretation of the present disclosure is not limited thereto. The same element as that illustrated in a drawing that has already been discussed is denoted by the same reference numeral throughout the description and the drawings, and detailed description thereof will not be repeated in some cases where appropriate.

In this disclosure, when an element is described as being "on" another element, the element can be directly on the other element, or there can be one or more elements between the element and the other element.

First Embodiment

Figure 2:
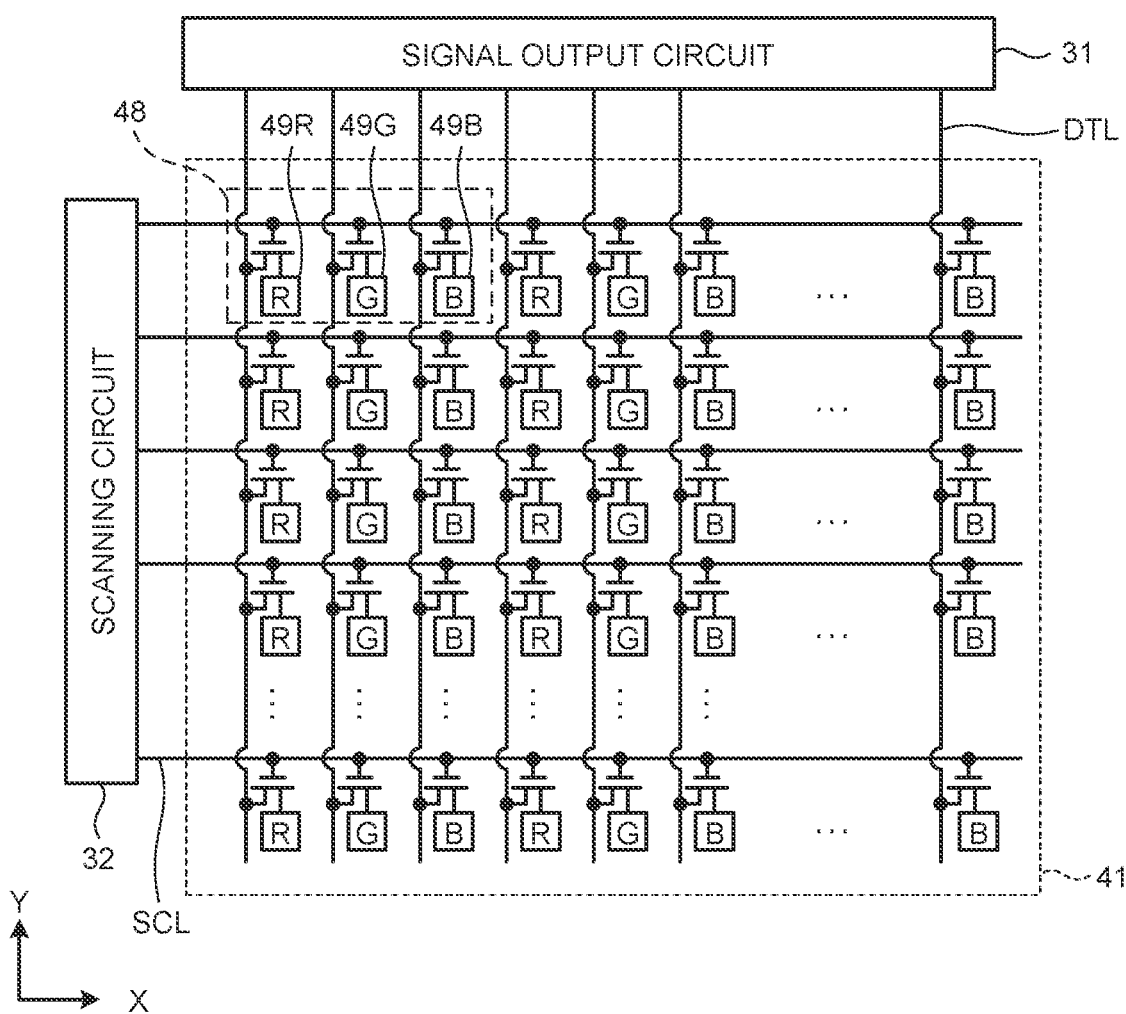
FIG. 2 is a conceptual diagram of an image display panel according to the first embodiment.

FIG. 1 is a block diagram illustrating an exemplary configuration of a display device according to a first embodiment of the present disclosure. FIG. 2 is a conceptual diagram of an image display panel according to the first embodiment. As illustrated in FIG. 1, a display device 10 of the first embodiment includes a signal processor 20, an image display panel 40, and a light source unit 60 (light source device). The image display panel 40 includes an image display panel driver 30 and a display part 33. The signal processor 20 performs predetermined data conversion processing on input image signals (red-green-blue (RGB) data) from an image transmitter 12 of a controller 11 to generate signals corresponding to the input image signals, and transmits the generated signals to components of the display device 10. The image display panel driver 30 controls driving of the display part 33 based on the signals from the signal processor 20. The light source unit 60 illuminates an image display surface 41 provided on the display part 33 of the image display panel 40 from a back surface side of the image display surface 41. The image display panel 40 displays an image using signals from the image display panel driver 30 and the light from the light source unit 60.

Describing the above by way of a more specific example, the image display panel 40 displays a frame image on the image display surface 41 for displaying an image. In the first embodiment, the input image signals representing respective RGB gradation values of a plurality of pixels constituting one frame image are received as a collective unit by the signal processor 20 within a predetermined period of time. The signal processor 20 outputs output signals and control signals based on the input image signals so as to display the frame image on the image display panel 40 within a predetermined one frame period. The control signals are signals for controlling operation of the light source unit 60. The light source unit 60 operates in accordance with the control signals under the control of the signal processor 20, and emits light having brightness required for the frame image displayed by the image display panel 40 from a light-emitting area 61 having a size corresponding to the image display surface 41. When input signals for one screen that serve as a basis for the frame image include gradation values assigned to a plurality of pixels, light having brightness required for a pixel assigned with the maximum gradation value to obtain luminance corresponding to the maximum gradation value is referred to as the "light having brightness required for the frame image". To obtain the light having the brightness required for the frame image, the signal processor 20 performs dimming processing of uniformly adjusting the light of the entire light-emitting area 61, or performs local dimming processing of adjusting the light from the light-emitting area 61 for each of the partial areas.

A plurality of pixels 48 are arranged in a two-dimensional matrix (row-column configuration) on the image display surface 41 of the display part 33. In this manner, the display part 33 serves as a display part having the pixels 48. FIG. 1 illustrates an example in which the pixels 48 are arranged in a matrix (row-column configuration) in a two-dimensional XY-coordinate system. In this example, an X-direction corresponds to a row direction, and a Y-direction corresponds to a column direction. However, the X- and Y-directions are not limited thereto. The X-direction may correspond to the vertical direction, and the Y-direction may correspond to the horizontal direction.

Each of the pixels 48 includes at least two of a first sub-pixel 49R, a second sub-pixel 49G, and a third sub-pixel 49B. The first sub-pixel 49R displays a first color (such as red). The second sub-pixel 49G displays a second color (such as green). The third sub-pixel 49B displays a third color (such as blue). The first color, the second color, and the third color are not limited to red, green, and blue. The first to third colors may be any colors different from one another, such as complementary colors. In the following description, the first sub-pixel 49R, the second sub-pixel 49G, and the third sub-pixel 49B are not necessary to be distinguished from one another, each of them will be called a "sub-pixel 49". In other words, each of the sub-pixels 49 is assigned any one of the three colors.

The image display panel 40 of the first embodiment is, for example, a transmissive color liquid crystal display panel. On the image display surface 41 of the display part 33, a first color filter for transmitting the first color is disposed between the first sub-pixel 49R and an image viewer. On the image display surface 41 of the display part 33, a second color filter for transmitting the second color is disposed between the second sub-pixel 49G and the image viewer. On the image display surface 41 of the display part 33, a third color filter for transmitting the third color is disposed between the third sub-pixel 49B and the image viewer.

The image display panel driver 30 includes a signal output circuit 31 and a scanning circuit 32. The image display panel driver 30 uses the signal output circuit 31 to hold the output signals and to sequentially output them to the display part 33. In more detail, the signal output circuit 31 outputs image signals having predetermined potentials corresponding to the output signals from the signal processor 20 to the display part 33. The signal output circuit 31 is electrically coupled to the display part 33 through signal lines DTL. The scanning circuit 32 controls on and off of switching elements for controlling operations (light transmittance) of the sub-pixels 49 in the display part 33. The switching elements are, for example, thin-film transistors (TFTs). The scanning circuit 32 is electrically coupled to the display part 33 through scanning lines SCL.

The light source unit 60 is disposed on the back surface side of the image display panel 40. The light source unit 60 emits the light toward the image display panel 40 to illuminate the image display panel 40.

Figure 3:
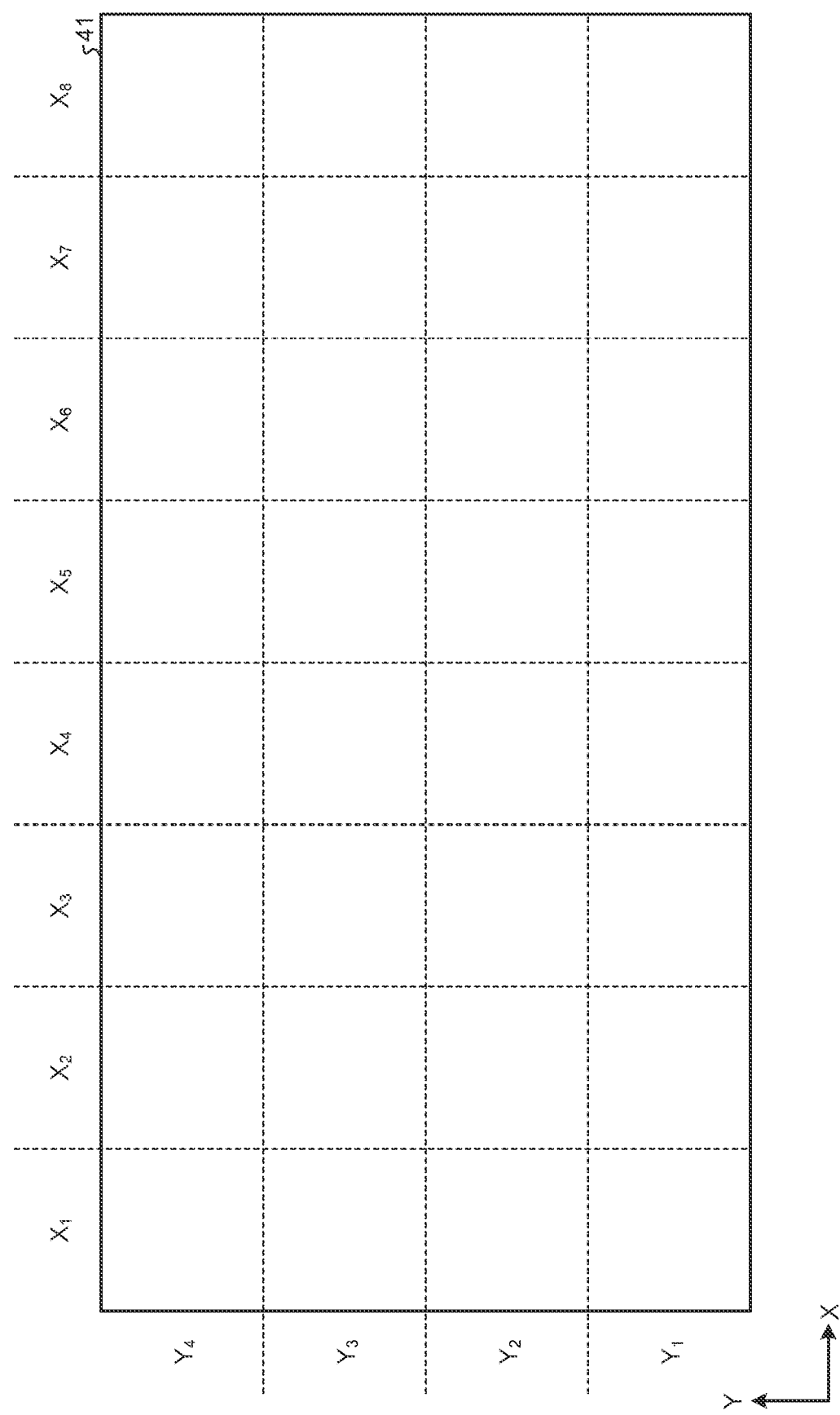
FIG. 3 is a schematic diagram illustrating an image display surface of the display device according to the first embodiment.

FIG. 3 is a schematic diagram illustrating an image display surface of the display device according to the first embodiment. The image display surface 41 is divided into a plurality of partial areas. FIG. 3 illustrates an example in which the image display surface 41 is divided into eight equal parts of $X_1, X_2, \ldots,$ and $X_8$ along the X-direction, and divided into four equal parts of $Y_1, Y_2, Y_3,$ and $Y_4$ along the Y-direction, and thereby, 8×4 partial areas are provided. When, as an example, 800 pixels 48 are arranged in the X-direction and 480 pixels 48 are arranged in the Y-direction, that is, 800×480 pixels 48 are arranged in a matrix (row-column configuration) on the image display surface 41, each of the partial areas illustrated in FIG. 3 includes 100×120 pixels 48. The division example of the image display surface 41 illustrated in FIG. 3 and the number of the pixels on the image display surface 41 are merely examples. The division example and the number of the pixels on the image display surface 41 are not limited thereto and can be changed as appropriate.

Figure 4:
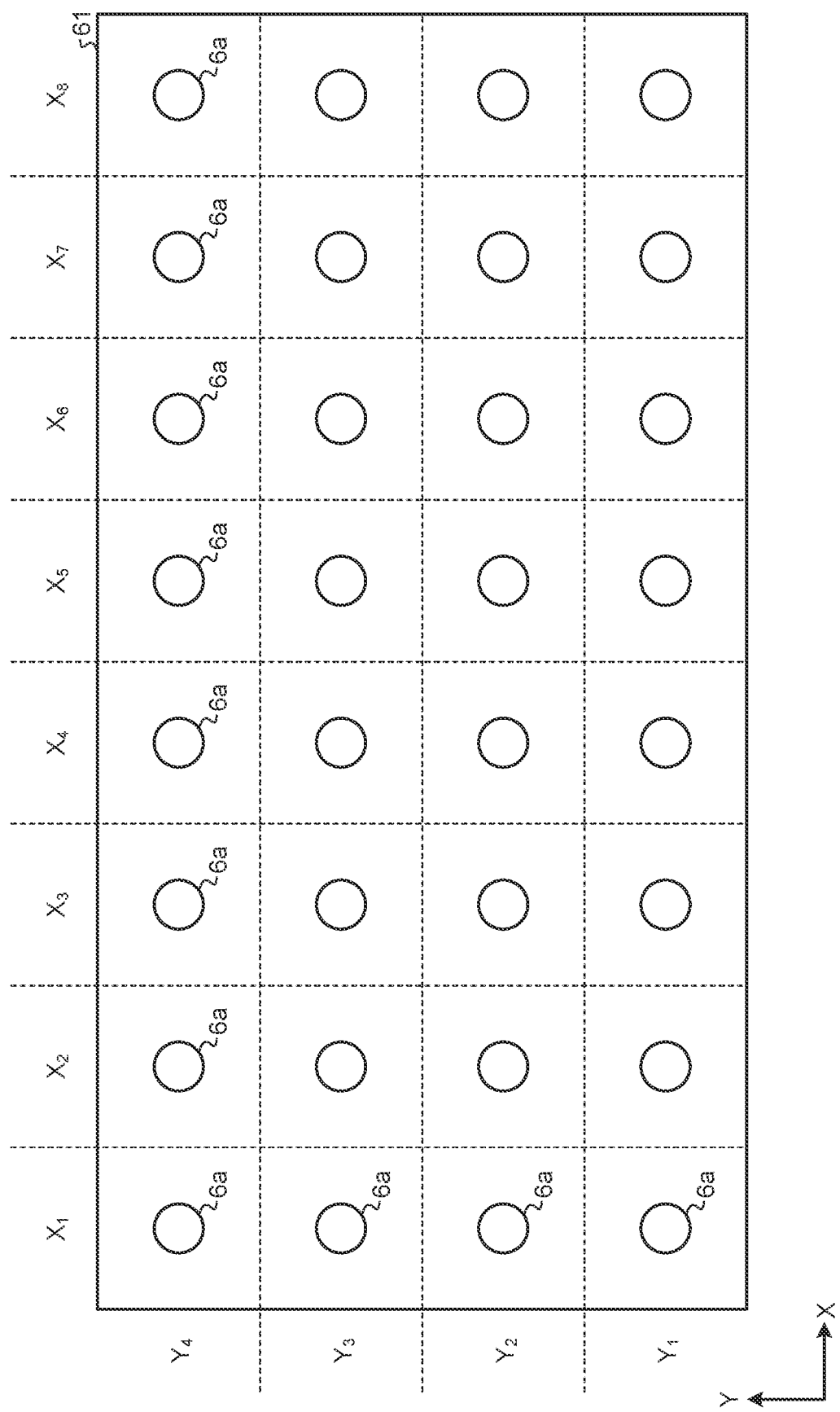
FIG. 4 is a diagram illustrating a light-emitting area of the display device according to the first embodiment.

FIG. 4 is a diagram illustrating the light-emitting area of the display device according to the first embodiment. FIG. 4 illustrates an example in which one light source 6a is disposed corresponding to each of the partial areas of the image display surface 41 illustrated in FIG. 3. The light source 6a is, for example, a light-emitting diode (LED), which is, however, a mere specific example of the light source 6a. The light source 6a is not limited to this example and can be changed as appropriate. FIG. 4 illustrates an example in which each of the light sources 6a is disposed so as to face a corresponding one of the partial areas of the image display surface 41 illustrated in FIG. 3. However, the configuration is not limited to this arrangement as long as a light quantity can be individually controlled in each of the partial areas and the light quantity of each of the partial areas is controllable. The configuration can be changed as appropriate.

Figure 5:
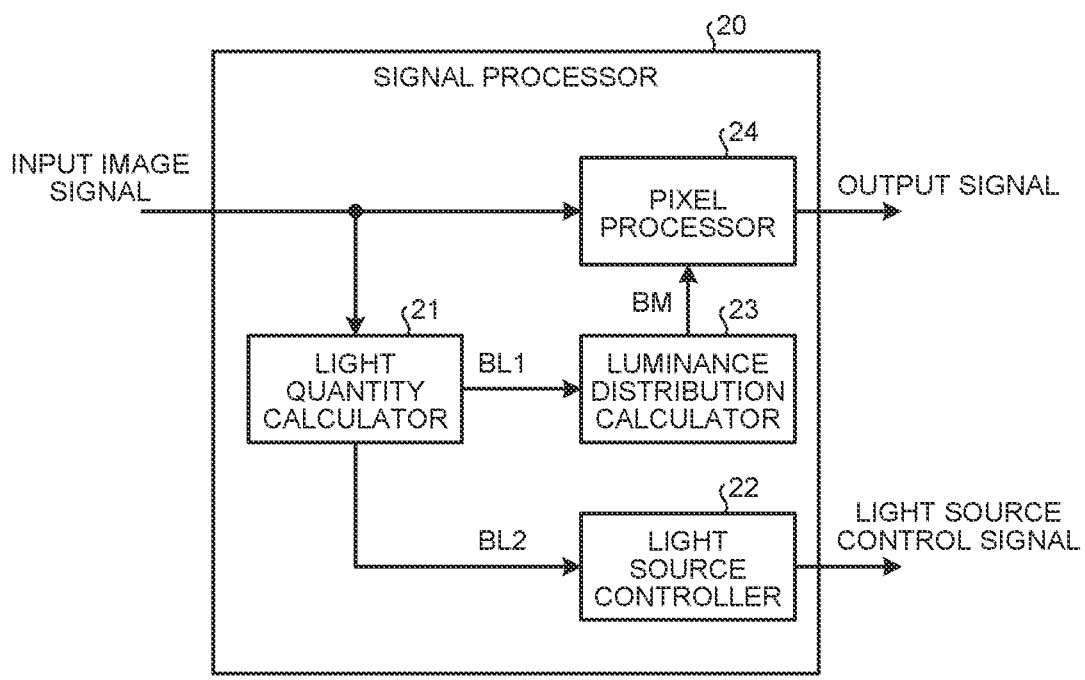
FIG. 5 is a functional block diagram illustrating a configuration example of a signal processor.

The following describes the signal processor 20. FIG. 5 is a functional block diagram illustrating a configuration example of the signal processor. The signal processor 20 includes a light quantity calculator 21, a light source controller 22, a luminance distribution calculator 23, and a pixel processor 24.

Figure 6:
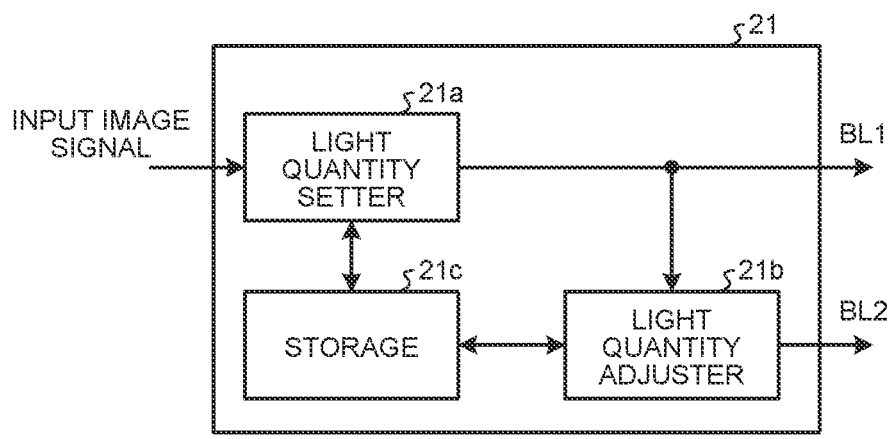
FIG. 6 is a functional block diagram illustrating a configuration example of a light quantity calculator.

FIG. 6 is a functional block diagram illustrating a configuration example of the light quantity calculator. The light quantity calculator 21 calculates the light quantity of the light source 6a corresponding to each of the partial areas on the image display surface 41.

As illustrated in FIG. 6, the light quantity calculator 21 includes a light quantity setter 21a, a light quantity adjuster 21b, and a storage 21c.

The light quantity setter 21a sets the light quantity (first light quantity) of the light source 6a provided corresponding to each of the partial areas based on the input image signals. The light quantity setter 21a individually sets the light quantity (first light quantity) for each of all the partial areas.

Specifically, the light quantity setter 21a calculates brightness of each of the pixels 48 included in each of the partial areas. Herein, as an example, a case will be described where each of the colors of the sub-pixels 49 is represented by an 8-bit gradation value.

The 8-bit gradation value can be represented by a numerical value having "0" as the minimum value and "255" as the maximum value. In the present embodiment, for example, when the gradation value of the second sub-pixel 49G is "255", the brightness of the pixel 48 including the second sub-pixel 49G is calculated to be 100 [%]. Also, when, for example, the gradation value of the second sub-pixel 49G is "127", and the gradation values of the first sub-pixel 49R and the third sub-pixel 49B included in the pixel 48 including the second sub-pixel 49G with a gradation value "127" are smaller than "127", the brightness of the pixel 48 including the second sub-pixel 49G is calculated to be 50 [%]. That is, the brightness corresponding to the maximum gradation value among the gradation values of the sub-pixels 49 included in the pixel 48 is calculated as the brightness of the pixel 48. The relation between the gradation value of the sub-pixel 49 and the brightness can be calculated from, for example, data in a table format or an arithmetic expression.

The light quantity setter 21a calculates the brightness of each of all the pixels 48 included in each of the partial areas. The light quantity setter 21a derives the brightness of the pixel 48 having the highest calculated brightness among all the pixels 48 included in each of the partial areas, as the brightness in the partial area. The light quantity setter 21a then sets the brightness in the partial area as the light quantity (first light quantity) in the partial area and outputs first light quantity information BL1 including the light quantity (first light quantity) of each of the partial areas.

Figure 7:
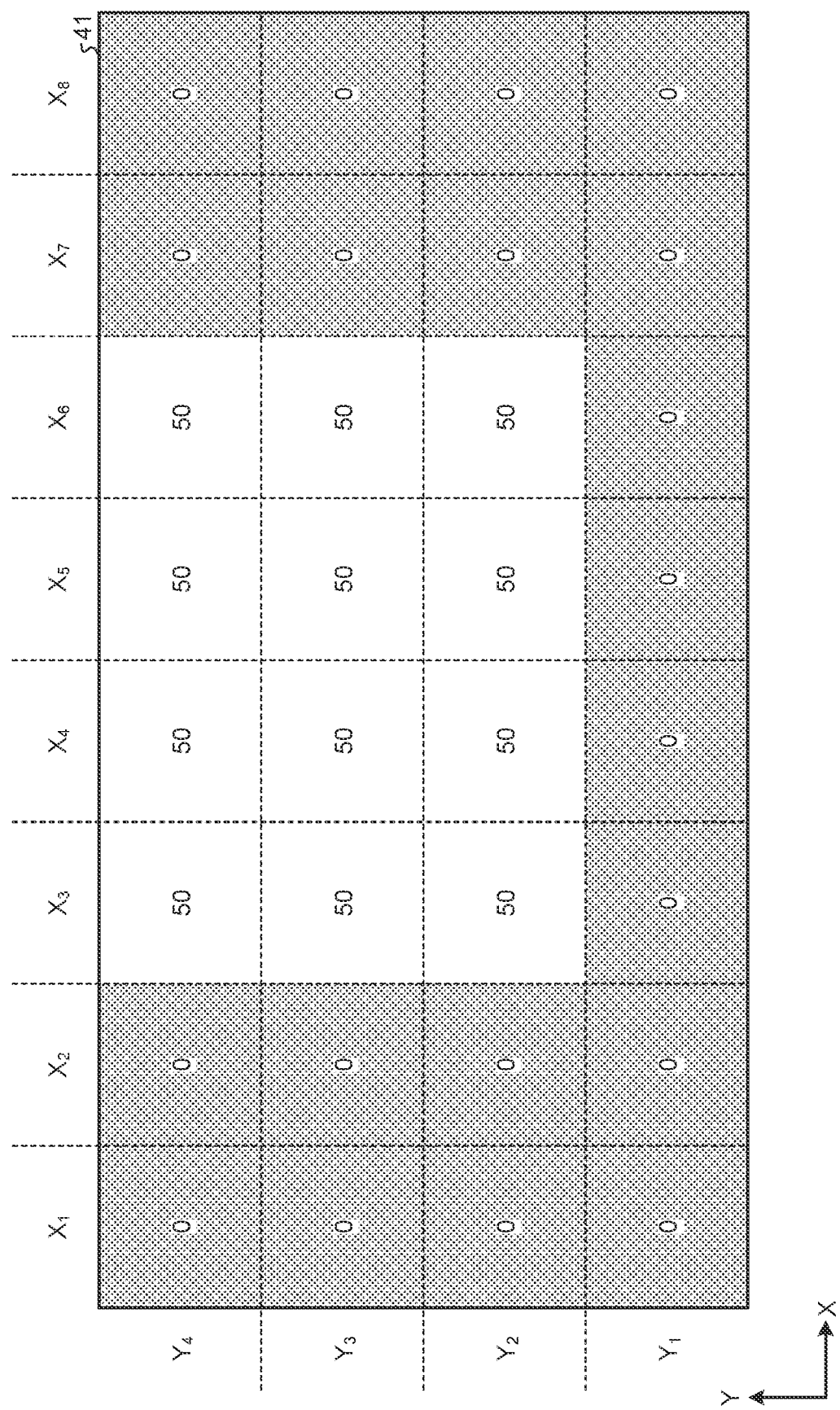
FIG. 7 is a schematic diagram illustrating exemplary light quantities in respective partial areas on the image display surface.

FIG. 7 is a schematic diagram illustrating an example of the light quantities in the respective partial areas on the image display surface. Numerical values written in rectangles representing the partial areas in FIG. 7 respectively indicate the light quantities in the partial areas.

The light quantity adjuster 21b is a component for adjusting the light quantity of each of the partial areas set by the light quantity setter 21a. The light quantity adjuster 21b adjusts the light quantity (first light quantity) in each of the partial areas based on the first light quantity information BL1 from the light quantity setter 21a and outputs second light quantity information BL2 including the adjusted light quantity (second light quantity) of each of the partial areas.

Figure 8:
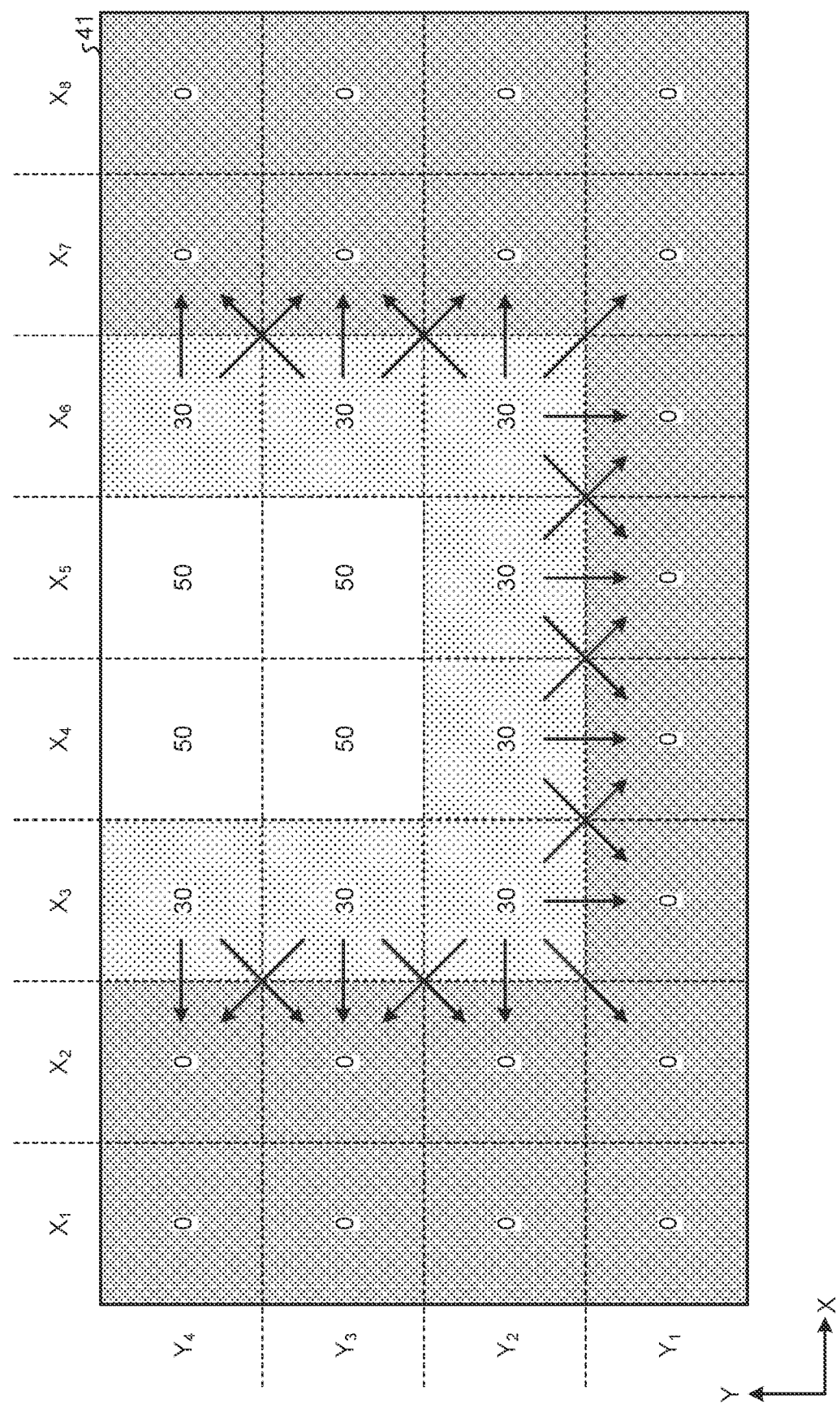
FIG. 8 is a schematic diagram illustrating an adjustment example of the light quantities in the respective partial areas.

FIG. 8 is a schematic diagram illustrating an adjustment example of the light quantities in the respective partial areas. The partial areas having a light quantity of 50 [%] adjacent to the partial areas having a light quantity of 0 [%] as illustrated in FIG. 7 are uniformly set to have a adjusted light quantity of 30 [%] in FIG. 8. Specifically, the light quantity adjuster 21b calculates the adjusted light quantity (second light quantity) by multiplying an adjustment coefficient k (=0.6) by the light quantity of 50 [%] of the partial areas having the light quantity of 50 [%] adjacent to the partial areas having the light quantity of 0 [%] in directions of arrows in FIG. 8.

The value of the adjustment coefficient k mentioned above is merely an example and can be changed as appropriate to, for example, a predetermined value preferably between 0.6 and 0.8 (both inclusive). The value of the adjustment coefficient k can be greater than 0 and equal to or smaller than 1.0 ($0<k\leq1.0$). In the case of adjusting the light quantities of the partial areas, the light quantities of the partial areas adjacent to the partial areas to be adjusted in light quantity is not limited to 0 [%] and can be changed as appropriate to be preferably equal to or smaller than, for example, a predetermined value in a range equal to or larger than 10 [%] and smaller than 15 [%].

In the present embodiment, the storage 21c stores discrete data in the form of a data table or an arithmetic expression that represents a relation between the gradation value of the sub-pixel 49 and the light quantity that is used by the light quantity setter 21a to calculate the light quantity of the sub-pixel 49, and also stores the adjustment coefficient k that is used by the light quantity adjuster 21b to adjust the light quantity in each of the partial areas.

Referring back to FIG. 5, the light source controller 22 outputs a light source control signal for controlling each of the light sources 6a in accordance with the light quantity (second light quantity) of a corresponding one of the partial areas based on the second light quantity information BL2 from the light quantity calculator 21. The luminance distribution calculator 23 calculates, based on the first light quantity information BL1 from the light quantity calculator 21, a luminance distribution of the entire light source unit 60 depending on the light quantities (first light quantities) of the respective partial areas. Specifically, the luminance distribution calculator 23 uses, for example, the data in the form of a table or an arithmetic expression to calculate the luminance distribution of the entire light source unit 60. The luminance distribution calculator 23 outputs luminance distribution information BM representing the luminance distribution to the pixel processor 24.

The pixel processor 24 obtains the gradation values of the pixels 48 for performing display output based on the input image signals with the luminance distribution represented by the luminance distribution information BM. Specifically, the pixel processor 24 adjusts the gradation value of each of the sub-pixels 49 constituting the pixel 48 included in each of the partial areas based on the luminance distribution information BM output from the luminance distribution calculator 23.

Figure 9:
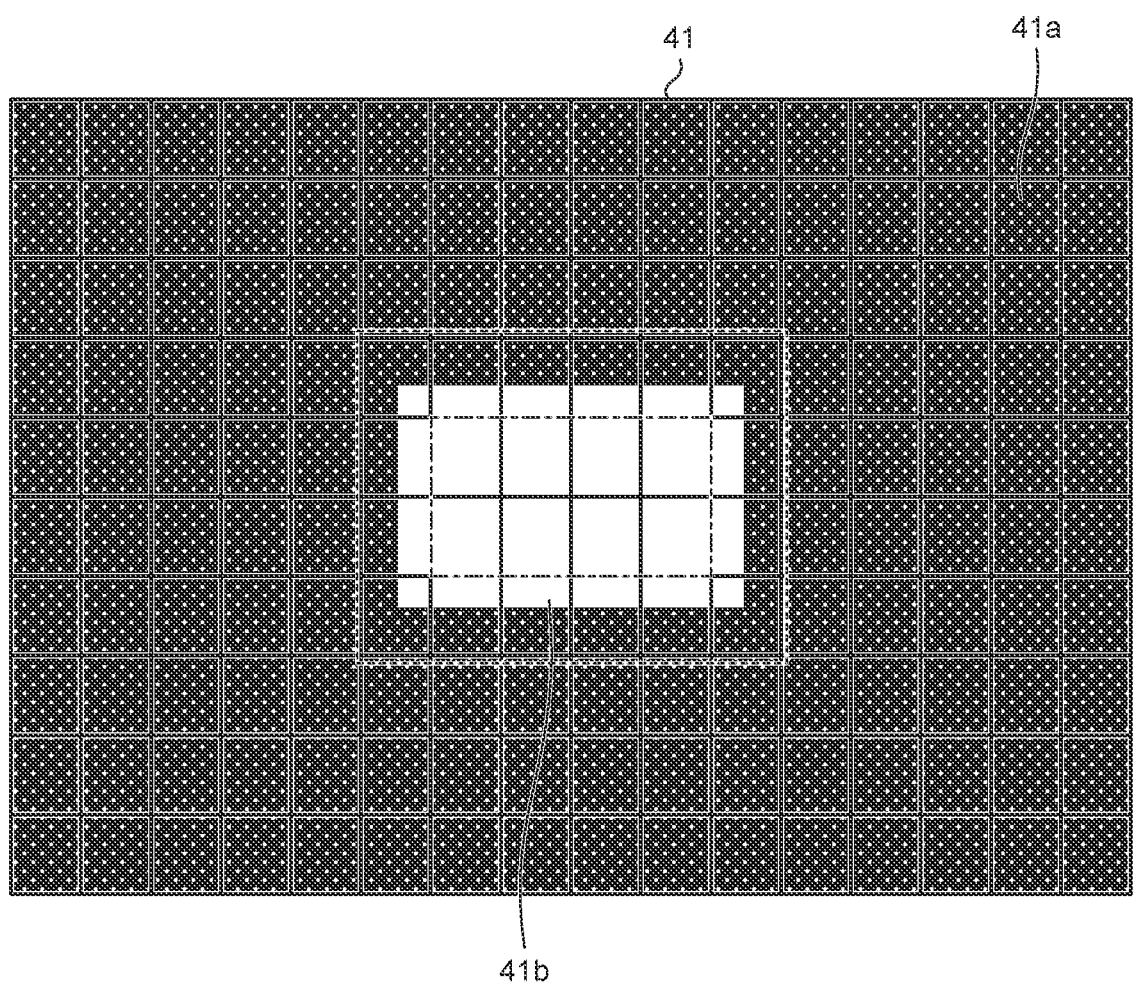
FIG. 9 is a diagram illustrating an exemplary input image.
Figure 10A:
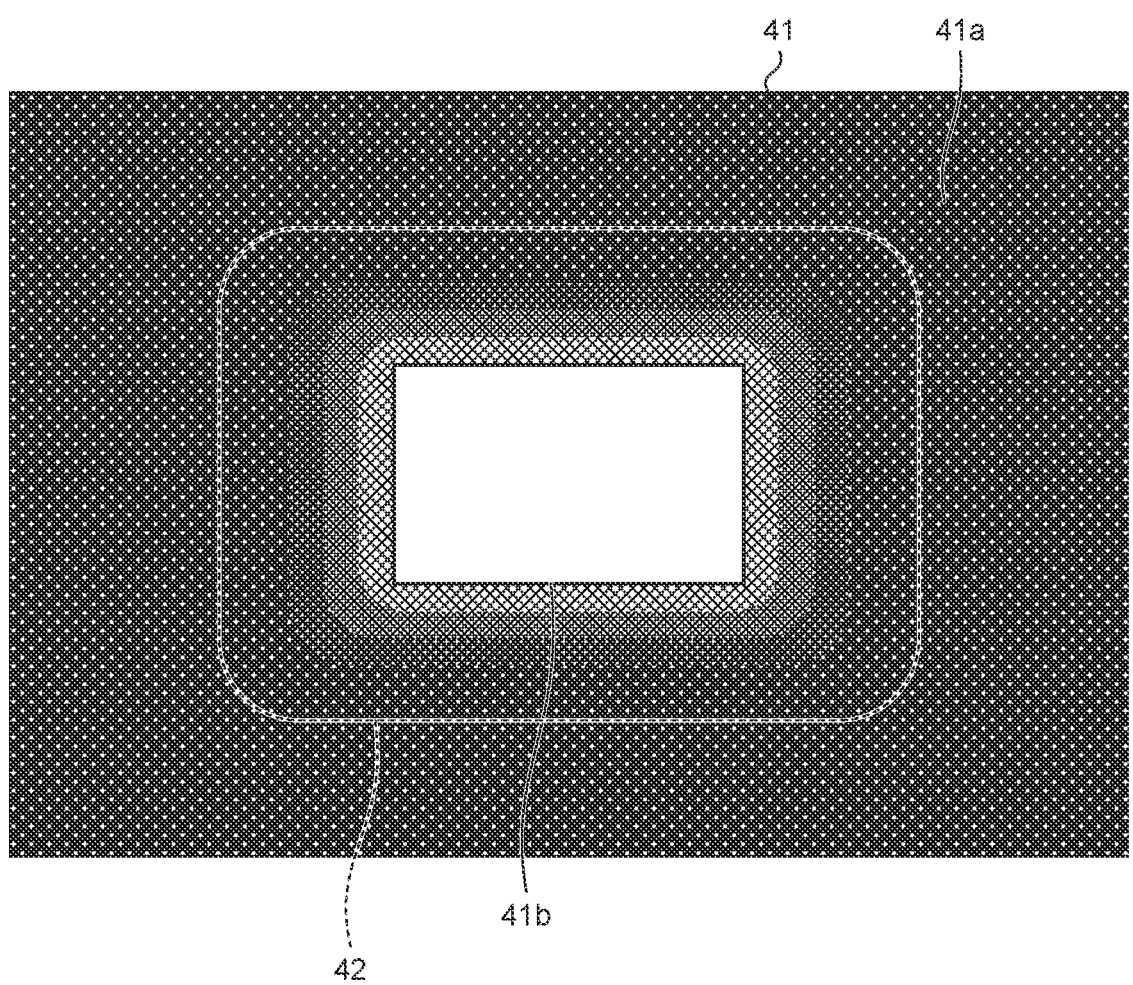
FIG. 10A is a diagram illustrating an image display example when a light quantity adjuster does not adjust the light quantities.
Figure 10B:
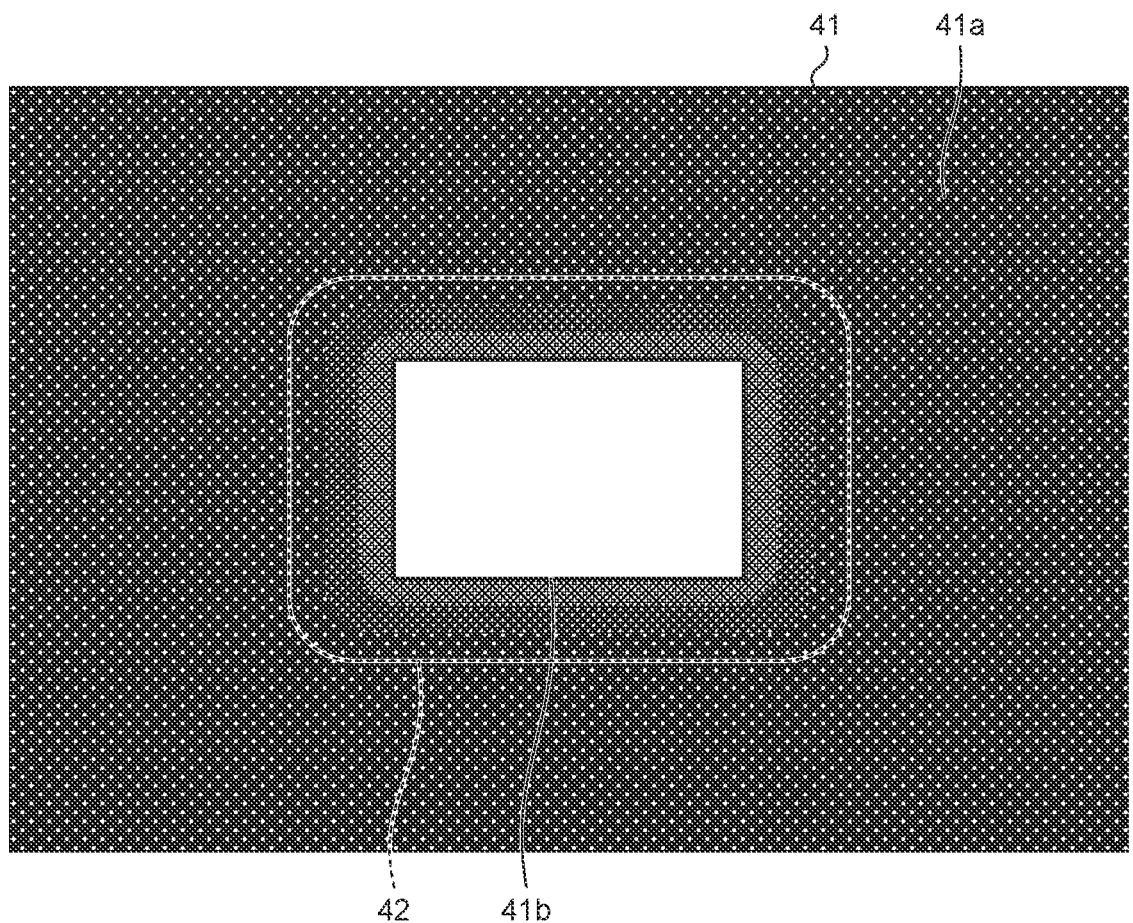
FIG. 10B is a diagram illustrating an image display example when the light quantity adjuster has adjusted the light quantities.

The following describes an advantageous effect of the display device 10 according to the present embodiment with reference to FIGS. 9, 10A, and 10B. FIG. 9 is a diagram illustrating an exemplary input image. FIG. 10A is a diagram illustrating an image display example when the light quantity adjuster does not adjust the light quantities. FIG. 10B is a diagram illustrating an image display example when the light quantity adjuster has adjusted the light quantities. FIG. 9 illustrates the input image in which a bright area 41b is displayed at the center of a dark area 41a. FIG. 9 displays boundary lines for dividing the image display surface 41 into the partial areas.

As illustrated in FIG. 9, for example, when the image display surface 41 displays the input image in which the bright area 41b is displayed at the center of the dark area 41a, what is called black floating 42 occurs in which light in the partial areas overlapping the bright area 41b illustrated within a dashed line of FIG. 9 leaks toward the dark area 41a, and thus, the dark area 41a around the bright area 41b is brightened. The black floating 42 is known as what is called a "halo" effect.

The black floating 42 due to the halo effect occurs not only in the partial areas lying on the boundary lines between the dark area 41a and the bright area 41b (the partial areas lying within the dashed line and outside a long dashed short dashed line in the example illustrated in FIG. 9), but also in the partial areas lying outside the boundary lines between the dark area 41a and the bright area 41b (the partial areas lying outside the dashed line in the example illustrated in FIG. 9). As a result, in the image display example when the light quantity adjuster 21b does not adjust the light quantities, the black floating 42 occurs in a wide area, and the dark area 41a around the bright area 41b is made brighter, as illustrated in FIG. 10A.

In the present embodiment, as described above, the light quantity adjuster 21b adjusts the light quantity of the partial areas (the partial areas lying within the dashed line and outside the long dashed short dashed line in the example illustrated in FIG. 9) adjacent to the partial areas (the partial areas lying outside the dashed line in the example illustrated in FIG. 9) having a light quantity equal to or smaller than a predetermined light quantity threshold (for example, a predetermined value equal to or larger than 10 [%] and smaller than 15 [%]) by multiplying the light quantity of the partial areas by the predetermined adjustment coefficient k that is greater than 0 and equal to or smaller than 1.0. This adjustment reduces the black floating in the partial areas lying on the boundary lines between the dark area 41a and the bright area 41b (the partial areas lying within the dashed line and outside the long dashed short dashed line in the example illustrated in FIG. 9). This adjustment also involves reduction of the black floating in the partial areas lying outside the boundary lines between the dark area 41a and the bright area 41b (the partial areas lying outside the dashed line in the example illustrated in FIG. 9). As a result, the black floating 42 in the dark area 41a around the bright area 41b that would be caused by the halo effect can be reduced, as illustrated in FIG. 10B. Specifically, in the image display example illustrated in FIG. 10B in which the light quantity adjuster 21b has adjusted the light quantities, the area in which the black floating 42 occurs can be made smaller and the brightness of the dark area 41a around the bright area 41b can be made lower than in the image display example illustrated in FIG. 10A in which the light quantity adjuster 21b does not adjust the light quantities.

The following describes light quantity adjustment processing performed by the light quantity adjuster according to the first embodiment with reference to FIGS. 11A, 11B, 11C, and 12.

Figure 11A:
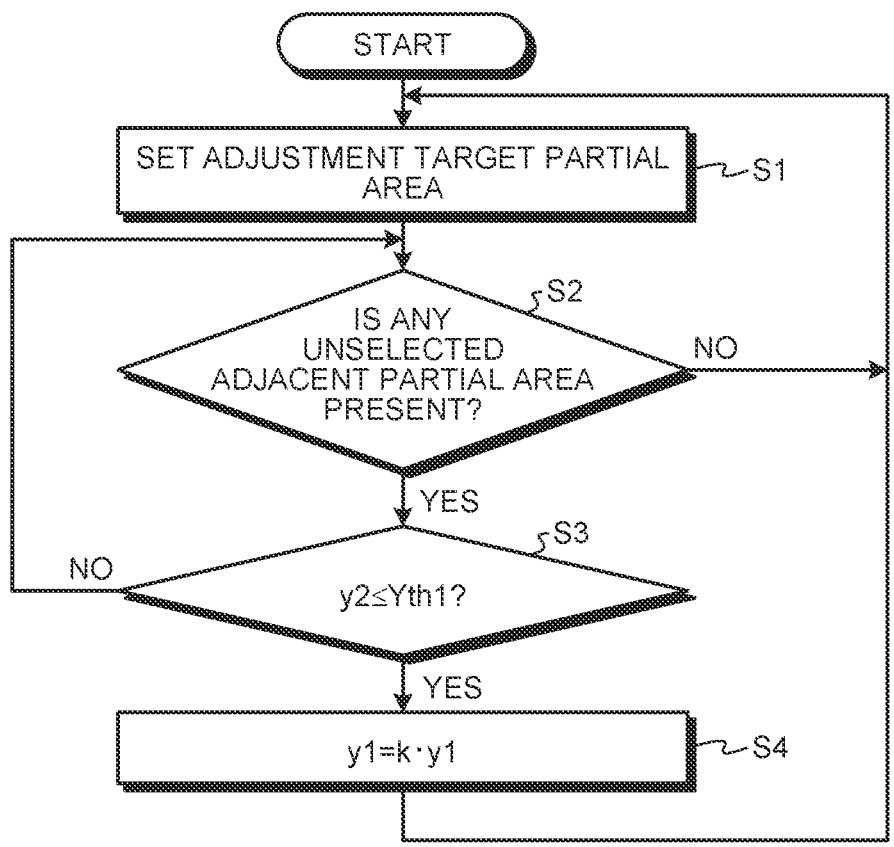
FIG. 11A is a flowchart illustrating an example of light quantity adjustment processing according to the first embodiment.
Figure 11B:
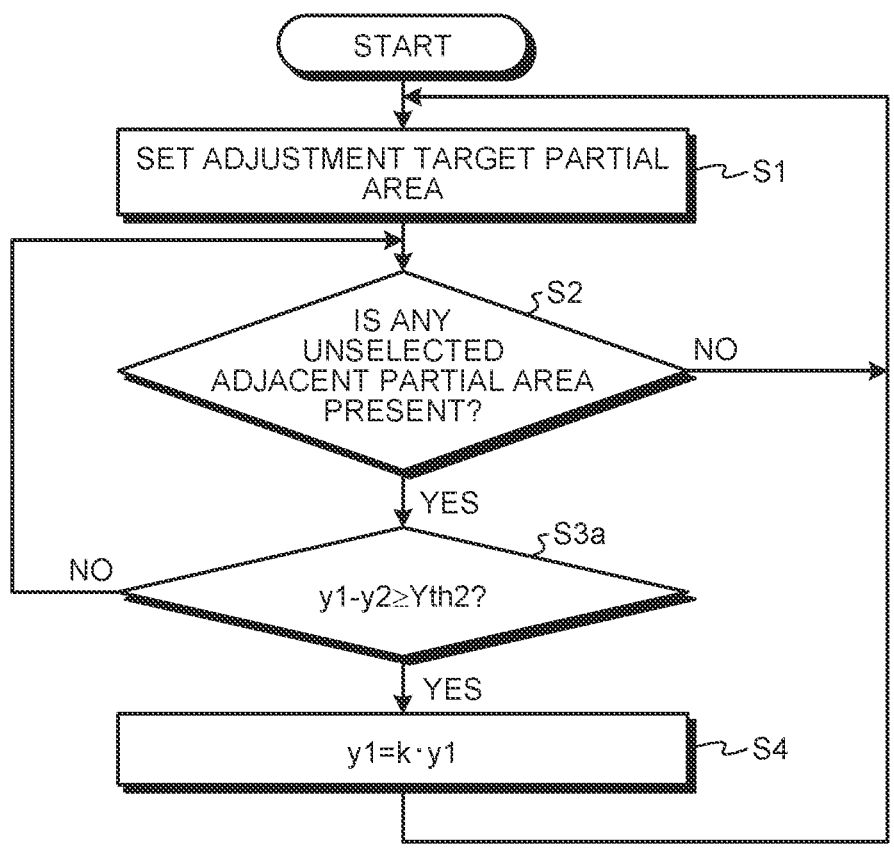
FIG. 11B is a flowchart illustrating a second example of the light quantity adjustment processing according to the first embodiment.
Figure 11C:
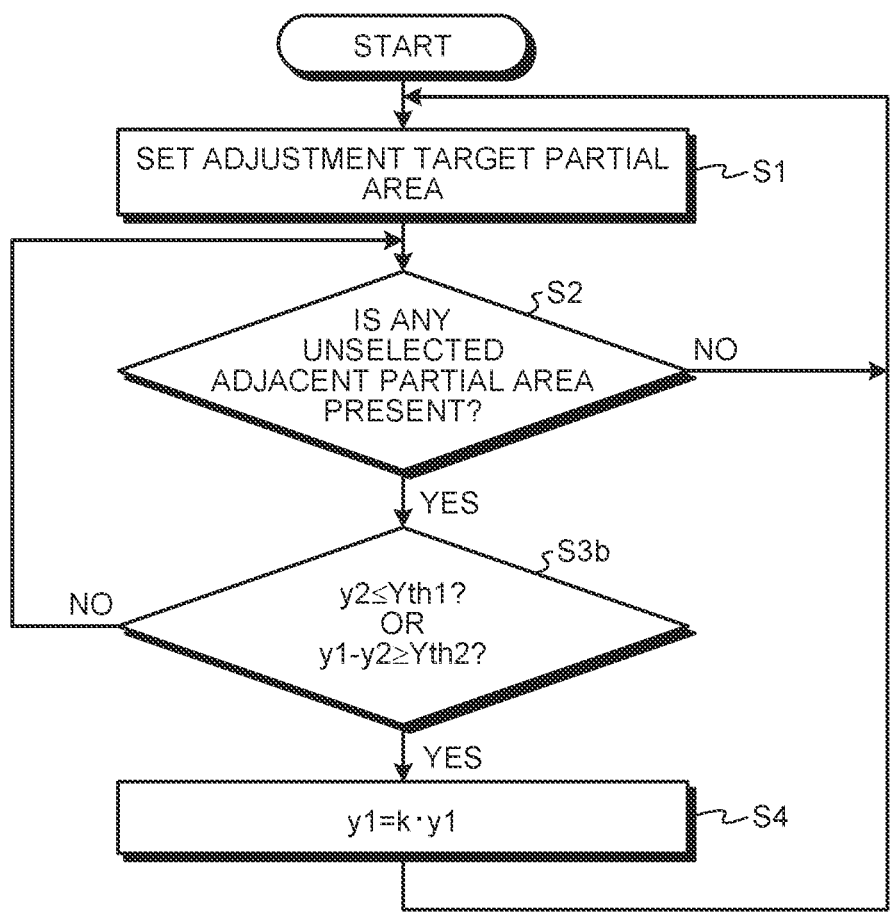
FIG. 11C is a flowchart illustrating a third example of the light quantity adjustment processing according to the first embodiment.
Figure 12:
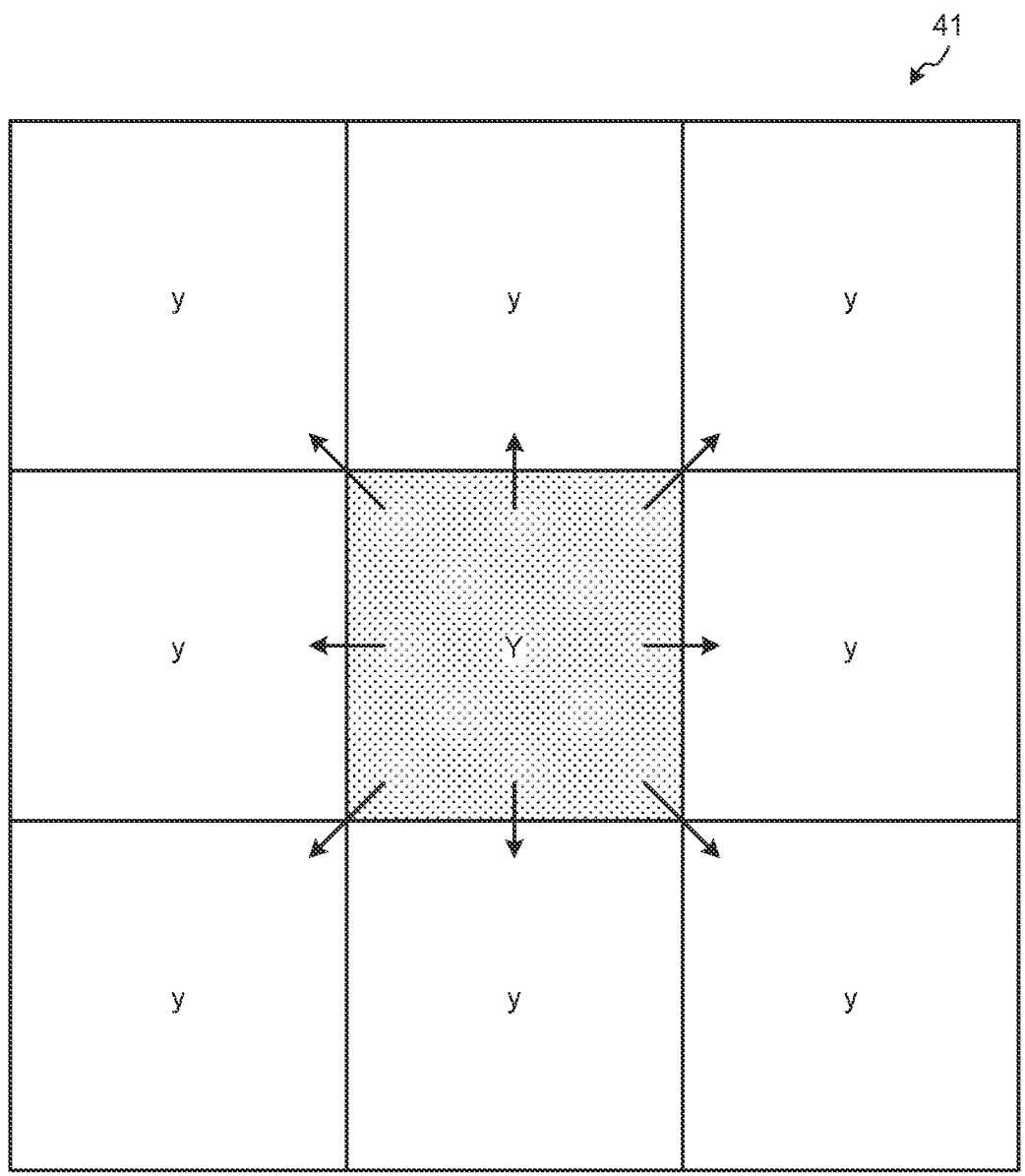
FIG. 12 is a diagram illustrating an adjustment target partial area and adjacent partial areas adjacent to the adjustment target partial area.

FIG. 11A is a flowchart illustrating a first example of the light quantity adjustment processing according to the first embodiment. FIG. 11B is a flowchart illustrating a second example of the light quantity adjustment processing according to the first embodiment. FIG. 11C is a flowchart illustrating a third example of the light quantity adjustment processing according to the first embodiment. FIG. 12 is a diagram illustrating an adjustment target partial area and adjacent partial areas adjacent to the adjustment target partial area. In the example illustrated in FIG. 12, the partial areas located around and adjacent in eight directions to the adjustment target partial area (partial area shaded in FIG. 12) to be adjusted for the light quantity are set as the adjacent partial areas. In the present embodiment, mainly the light quantity adjuster 21b of the light quantity calculator 21 performs the light quantity adjustment processing illustrated in FIGS. 11A, 11B, and 11C.

In the first example illustrated in FIG. 11A, if a light quantity y2 of the adjacent partial areas is equal to or smaller than a first threshold Yth1 (y2≤Yth1), the light quantity adjuster 21b adjusts the light quantity y1 of the adjustment target partial area by multiplying the light quantity y1 by the adjustment coefficient k (y1=k·y1).

Specifically, the light quantity adjuster 21b sequentially selects each of the partial areas of the image display surface 41 illustrated in FIG. 3 and sets the selected partial area as the adjustment target partial area for the light quantity (Step S1). The present disclosure is not limited by the selection order of the partial areas.

Subsequently, the light quantity adjuster 21b sequentially selects the adjacent partial areas illustrated in FIG. 12 and determines whether any unselected adjacent partial area is present (Step S2). The present disclosure is not limited by the selection order of the adjacent partial areas.

If no unselected adjacent partial area is present, that is, if all the adjacent partial areas have been selected (No at Step S2), the process returns to Step S1, and a new adjustment target partial area is set. If any unselected adjacent partial area is present (Yes at Step S2), the light quantity adjuster 21b determines whether the light quantity y2 of the adjacent partial area is equal to or smaller than the predetermined first threshold Yth1 (y2≤Yth1) (Step S3). If the light quantity y2 of the adjacent partial area is larger than the first threshold Yth1 (y2>Yth1) (No at Step S3), the process returns to Step S2, and the processing at Step S3 is performed on a newly selected adjacent partial area (if Yes at Step S2).

If the light quantity y2 of the adjacent partial area is equal to or smaller than the first threshold Yth1 (y2≤Yth1) (Yes at Step S3), the light quantity adjuster 21b adjusts the light quantity y1 of the adjustment target partial area by multiplying the light quantity y1 by the adjustment coefficient k (y1=k·y1) (Step S4), and the process returns to Step S1. Then, the processing up to Step S4 is repeated on an adjustment target partial area that is newly set (at Step S1).

In the second example illustrated in FIG. 11B, if a difference value obtained by subtracting the light quantity y2 of the adjacent partial area from the light quantity y1 of the adjustment target partial area is equal to or larger than a second threshold Yth2 (y1−y2≥Yth2), the light quantity adjuster 21b corrects the light quantity y1 of the adjustment target partial area by multiplying the light quantity y1 by the adjustment coefficient k (y1=k·y1). In the second example illustrated in FIG. 11B, the adjustment coefficient k stored in the storage 21c may be set to, for example, a value corresponding to the difference value obtained by subtracting the light quantity y2 of the adjacent partial area from the light quantity y1 of the adjustment target partial area as an aspect of the present disclosure, or the adjustment coefficient k may be tabulated and stored in the storage 21c as another aspect of the present disclosure. As still another aspect of the present disclosure, the value of the adjustment coefficient k may be reduced as the difference value obtained by subtracting the light quantity y2 of the adjacent partial area from the light quantity y1 of the adjustment target partial area increases.

Specifically, if any unselected adjacent partial area is present (Yes at Step S2), the light quantity adjuster 21b determines whether the difference value obtained by subtracting the light quantity y2 of the adjacent partial area from the light quantity y1 of the adjustment target partial area is equal to or larger than the second threshold Yth2 (y1−y2≥Yth2) (Step S3a). If the difference value obtained by subtracting the light quantity y2 of the adjacent partial area from the light quantity y1 of the adjustment target partial area is smaller than the second threshold Yth2 (y1−y2<Yth2) (No at Step S3a), the process returns to Step S2, and the processing at Step S3a is performed on a newly selected adjacent partial area (if Yes at Step S2).

If the difference value obtained by subtracting the light quantity y2 of the adjacent partial area from the light quantity y1 of the adjustment target partial area is equal to or larger than the second threshold Yth2 (y1−y2≥Yth2) (Yes at Step S3a), the light quantity adjuster 21b adjusts the light quantity y1 of the adjustment target partial area by multiplying the light quantity y1 by the adjustment coefficient k (y1=k·y1) (Step S4).

In the third example illustrated in FIG. 11C, the first example illustrated in FIG. 11A is combined with the second example illustrated in FIG. 11B. That is, in the third example illustrated in FIG. 11C, if the light quantity y2 of the adjacent partial area is equal to or smaller than the first threshold Yth1 (y2≤Yth1), or if the difference value obtained by subtracting the light quantity y2 of the adjacent partial area from the light quantity y1 of the adjustment target partial area is equal to or larger than the second threshold Yth2 (y1−y2≥Yth2), the light quantity adjuster 21b adjusts the light quantity y1 of the adjustment target partial area by multiplying the light quantity y1 by the adjustment coefficient k (y1=k·y1).

Specifically, if any unselected adjacent partial area is present (Yes at Step S2), the light quantity adjuster 21b determines whether the light quantity y2 of the adjacent partial area is equal to or smaller than the predetermined first threshold Yth1 (y2≤Yth1), and whether a difference value ytd obtained by subtracting the light quantity y2 of the adjacent partial area from the light quantity y1 of the adjustment target partial area is equal to or larger than the second threshold Yth2 (y1−y2≥Yth2) (Step S3b). If the light quantity y2 of the adjacent partial area is larger than the first threshold Yth1 (y2>Yth1), and the difference value obtained by subtracting the light quantity y2 of the adjacent partial area from the light quantity y1 of the adjustment target partial area is smaller than the second threshold Yth2 (y1−y2<Yth2) (No at Step S3b), the process returns to Step S2, and the processing at Step S3b is performed on a newly selected adjacent partial area (if Yes at Step S2).

If the light quantity y2 of the adjacent partial area is equal to or smaller than the first threshold Yth1 (y2≤Yth1), or if the difference value obtained by subtracting the light quantity y2 of the adjacent partial area from the light quantity y1 of the adjustment target partial area is equal to or larger than the second threshold Yth2 (y1−y2≥Yth2) (Yes at Step S3b), then the light quantity adjuster 21b adjusts the light quantity y1 of the adjustment target partial area by multiplying the light quantity y1 by the adjustment coefficient k (y1=k·y1) (Step S4).

The above-described light quantity adjustment processing illustrated in FIG. 11A, 11B, or 11C can reduce the light quantity of the bright area (for example, the bright area 41b illustrated in FIGS. 10A and 10B) adjacent to the dark area (for example, the dark area 41a illustrated in FIGS. 10A and 10B). As a result, the black floating in the dark area around the bright area that would be caused by the halo effect can be reduced.

As described above, the display device 10 according to the first embodiment includes the image display panel 40 having the image display surface 41 on which the display is controlled based on the input image signals, the light source unit 60 (light source device) that includes the light sources 6a provided corresponding to the divided partial areas of the image display surface 41 and illuminates the image display surface 41, and the signal processor 20 that calculates the light quantity of the light source 6a for each of the partial areas. The signal processor 20 calculates the light quantity for each of the partial areas based on the input image signals, and sets one of the partial areas as the adjustment target partial area for the light quantity. If the light quantity y2 of the adjacent partial area located around the adjustment target partial area is equal to or smaller than the predetermined first threshold Yth1, the signal processor 20 adjusts the light quantity y1 in the adjustment target partial area.

The display device 10 according to the first embodiment includes the image display panel 40 having the image display surface 41 on which the display is controlled based on the input image signals, the light source unit 60 (light source device) that includes the light sources 6a provided corresponding to the divided partial areas of the image display surface 41 and illuminates the image display surface 41, and the signal processor 20 that calculates the light quantity of the light source 6a for each of the partial areas. The signal processor 20 calculates the light quantity for each of the partial areas based on the input image signals, and sets one of the partial areas as the adjustment target partial area for the light quantity. If the difference value obtained by subtracting the light quantity y2 of the adjacent partial area located around the adjustment target partial area from the light quantity y1 of the adjustment target partial area is equal to or smaller than the predetermined second threshold Yth2, the signal processor 20 adjusts the light quantity y1 in the adjustment target partial area.

The display device 10 according to the first embodiment includes the image display panel 40 having the image display surface 41 on which the display is controlled based on the input image signals, the light source unit 60 (light source device) that includes the light sources 6a provided corresponding to the divided partial areas of the image display surface 41 and illuminates the image display surface 41, and the signal processor 20 that calculates the light quantity of the light source 6a for each of the partial areas. The signal processor 20 calculates the light quantity for each of the partial areas based on the input image signals, and sets one of the partial areas as the adjustment target partial area for the light quantity. If the light quantity y2 of the adjacent partial area located around the adjustment target partial area is equal to or smaller than the predetermined first threshold Yth1, or if the difference value obtained by subtracting the light quantity y2 of the adjacent partial area from the light quantity y1 of the adjustment target partial area is equal to or smaller than the predetermined second threshold Yth2, the signal processor 20 adjusts the light quantity y1 in the adjustment target partial area.

In the above-described configuration, the signal processor 20 adjusts the light quantity in the adjustment target partial area by multiplying the light quantity in the adjustment target partial area by the adjustment coefficient k having a value equal to or smaller than 1.

The display device 10 according to the first embodiment can also have the following aspect by setting the "adjustment target partial area" as a "first divided area", and setting the "adjacent partial area" as a "second divided area".

Specifically, the display device 10 according to the first embodiment can include the image display panel 40 on which an image is displayed based on image signals, and the light source unit 60 (light source device) that has the first divided area and a second divided area adjacent to the first divided area that face the image display surface 41 of the image display panel 40, and the image display panel 40 can be configured to calculate the light quantity of the first divided area and the light quantity of the second divided area based on the image signals, and reduce the light quantity of the first divided area if the light quantity of the second divided area is equal to or smaller than a predetermined value.

Alternatively, the display device 10 according to the first embodiment can include the image display panel 40 on which the image is displayed based on the image signals, and the light source unit 60 (light source device) that has the first divided area and the second divided area adjacent to the first divided area that face the image display surface 41 of the image display panel 40, and the image display panel 40 can be configured to calculate the light quantity of the first divided area and the light quantity of the second divided area based on the image signals, and reduce the light quantity of the first divided area if the light quantity of the first divided area is larger than the light quantity of the second divided area by a predetermined value or more.

Still alternatively, the display device 10 according to the first embodiment can include the image display panel 40 on which the image is displayed based on the image signals, and the light source unit 60 (light source device) that has the first divided area and the second divided area adjacent to the first divided area that face the image display surface 41 of the image display panel 40, and the image display panel 40 can be configured to calculate the light quantity of the first divided area and the light quantity of the second divided area based on the image signals, and reduce the light quantity of the first divided area if the light quantity of the second divided area is equal to or smaller than a predetermined value, or if the light quantity of the first divided area is larger than the light quantity of the second divided area by a predetermined value or more.

In the above-described configuration, the image display panel 40 lights the first divided area at a light quantity obtained by multiplying the light quantity of the first divided area by the adjustment coefficient k having a value of one or smaller.

The above-described configuration can reduce the black floating in the dark area that would be caused by the halo effect.

According to the present embodiment, the display device 10 can be obtained that reduces the black floating in the dark area that would be caused by the halo effect.

Second Embodiment

In the first embodiment, the example has been described in which the light quantity of the partial area adjacent to the partial area having a light quantity equal to or smaller than a predetermined value (for example, a predetermined value equal to or larger than 10 [%] and smaller than 15 [%]) is adjusted by being multiplied by the adjustment coefficient k. In a second embodiment, an example will be described in which the value of the adjustment coefficient k is calculated in accordance with the input image signals. The description will not be repeated for the components equivalent or identical to those in the above-described first embodiment.

In the first embodiment, the brightness of each of the partial areas is handled as the light quantity of the partial area, whereas in the present embodiment, the attention is further focused on a relation between the brightness and the luminance. For example, the luminance of the bright area 41b in FIG. 9 in which a blue or red window is displayed is lower than the luminance of the bright area 41b in which a green window is displayed, even when, for example, the brightness of the bright area 41b is substantially the same in both of the case in which the blue or red window is displayed therein and the case in which the green window is displayed therein. In this manner, when the luminance of the bright area 41b is lower, the halo effect may cause the black floating 42 in the dark area 41a around the bright area 41b to be more visible than when the luminance of the bright area 41b is higher, even though the brightness of the bright area 41b is substantially the same in both cases.

In the following description, input gradations are denoted as (Rin, Gin, Bin). The input gradations (Rin, Gin, Bin) are information that can be derived based on the input image signals. The input gradations (Rin, Gin, Bin) are individually given to the pixels 48. Rin corresponds to the gradation value of the first sub-pixel 49R. Gin corresponds to the gradation value of the second sub-pixel 49G. Bin corresponds to the gradation value of the third sub-pixel 49B. That is, the input image signals constituting the frame image include information that can be used for deriving the input gradations (Rin, Gin, Bin) individually given to the pixels 48. The information that can be used for deriving the input gradations (Rin, Gin, Bin) is, for example, RGB data (R, G, B).

Luminance Y(R, G, B) of the input RGB data (R, G, B) can be represented by Expression (1) below.

$$Y(R,G,B)=0.25*R+0.5*G+0.25*B \tag{1}$$

The luminance Y(R, G, B) can be represented using Expression (1') specified by the International Telecommunication Union Radiocommunication Sector (ITU-R) BT.709, or Expression (1") specified by ITU-R BT.601.

$$Y(R,G,B)=0.2126*R+0.7152*G+0.0722*B \tag{1'}$$

$$Y(R,G,B)=0.299*R+0.587*G+0.144*B \tag{1''}$$

The luminance Y(R, G, B) that can be represented by Expression (1), Expression (1'), or Expression (1") is also called "visual luminance".

Figure 13:
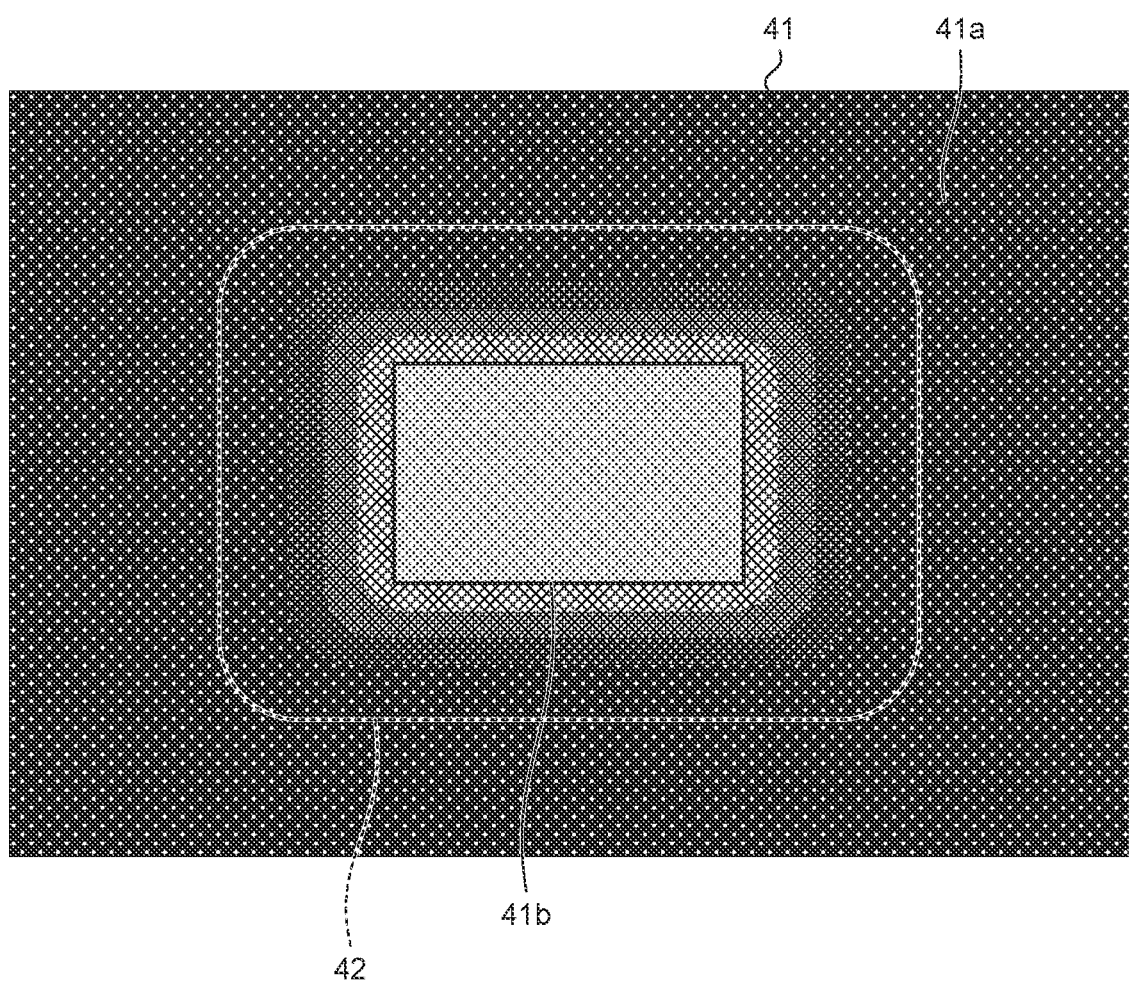
FIG. 13 is a diagram illustrating an image display example when visual luminance is lower in a bright area of the input image illustrated in FIG. 9.
Figure 14:
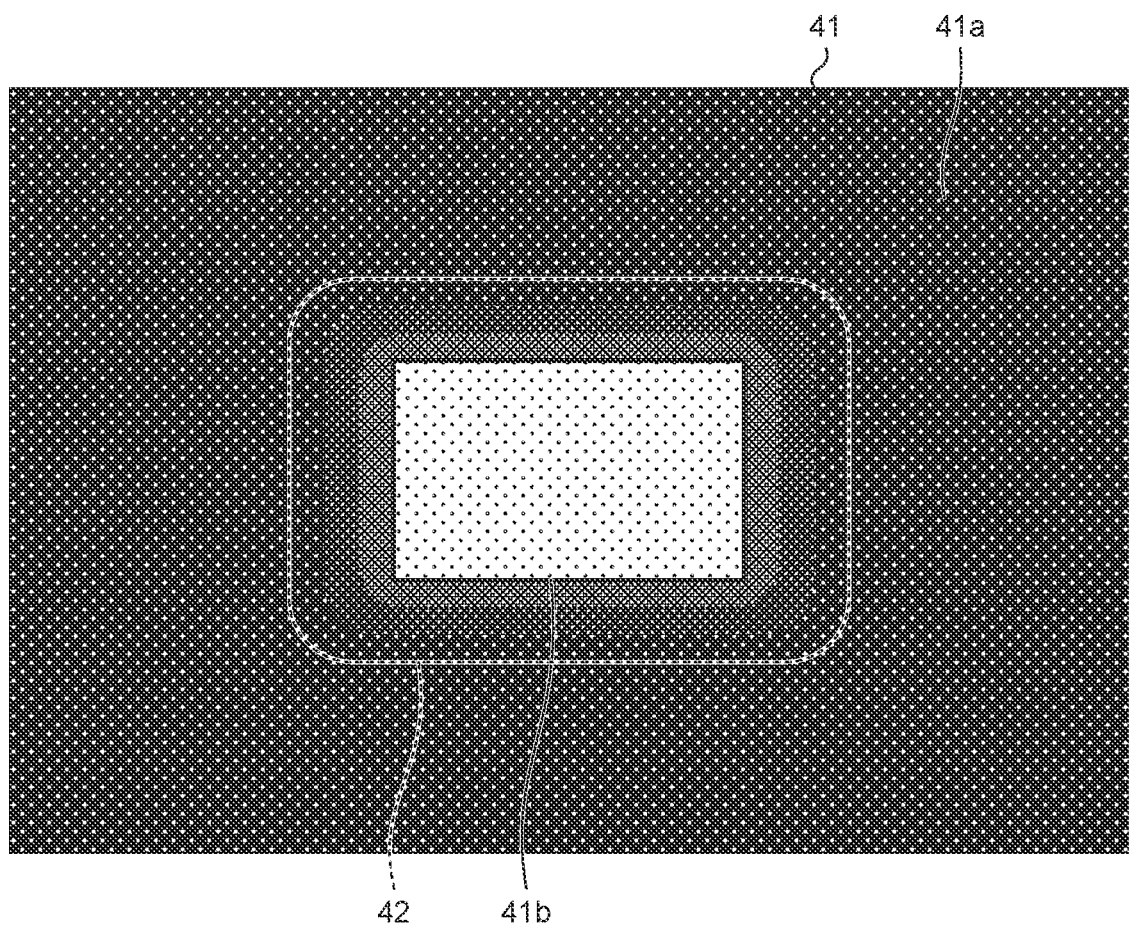
FIG. 14 is a diagram illustrating an image display example when the visual luminance is higher in the bright area of the input image illustrated in FIG. 9.

FIG. 13 is a diagram illustrating an image display example when the visual luminance is lower in the bright area of the input image illustrated in FIG. 9. FIG. 14 is a diagram illustrating an image display example when the visual luminance is higher in the bright area of the input image illustrated in FIG. 9. FIGS. 13 and 14 illustrate the examples in which the respective bright areas 41b are substantially the same as each other in brightness and different from each other in visual luminance.

As an example in which the visual luminance is lower in the bright area 41b of the input image illustrated in FIG. 13, a case is assumed where, for example, a blue or red window is displayed in the bright area 41b. As an example in which the visual luminance is higher in the bright area 41b of the input image illustrated in FIG. 14, a case is assumed where, for example, a green window is displayed in the bright area 41b. In this manner, when the visual luminance of the bright area 41b is lower (refer to FIG. 13), the halo effect causes the black floating 42 in the dark area 41a around the bright area 41b to be more visible than when the visual luminance of the bright area 41b is higher (refer to FIG. 14) even though the brightness of the bright area 41b is substantially the same in both examples.

In the present embodiment, the adjustment coefficient k is calculated according to the brightness and the luminance of the input image signals for each of the partial areas, and the calculated adjustment coefficient k is used to adjust the light quantity of the adjustment target partial area. This processing can effectively reduce the black floating 42 in the dark area 41a around the bright area 41b that would be caused by the halo effect. The following describes details of processing performed by the components of the signal processor 20.

In the present embodiment, the light quantity adjuster 21b of the light quantity calculator 21 calculates the luminance Y(R, G, B) of each of all the pixels 48 included in each of the partial areas, and derives, as the luminance Y(R, G, B) of each partial area, the luminance Y(R, G, B) of one of all the pixels 48 included in the partial area, the one pixel 48 having the highest calculated luminance Y(R, G, B) among the calculated luminances of all the pixels 48 in the partial area.

In the present embodiment, the light quantity adjuster 21b of the light quantity calculator 21 calculates the brightness of each of all the pixels 48 included in each of the partial areas as Max(R, G, B) and derives, as the brightness Max(R, G, B) of each partial area, the brightness Max(R, G, B) of one of all the pixels 48 included in the partial area, the one pixel 48 having the highest calculated brightness Max(R, G, B) among the calculated brightnesses Max(R, G, B) of all the pixels 48 in the partial area.

In the present embodiment, the light quantity adjuster 21b calculates the adjustment coefficient k. The calculation expression of the adjustment coefficient k in the present embodiment can be represented as Expression (2) below.

$$k=(1.0-G)*\text{Coef}+G \quad (2)$$

In Expression (2) above, G has the same value as that of the adjustment coefficient k described in the first embodiment. That is, G can be set to a predetermined value between 0.6 and 0.8 (both inclusive), for example.

In Expression (2) above, Coef is a coefficient value that can be represented as Expression (3) below.

$$\text{Coef}=a*\text{CoefY}+b*\text{CoefV} \quad (3)$$

In Expression (3) above, a and b are constants between 0 and 1 (both inclusive) and have a relation a+b≤1. These values only need to be set as appropriate in accordance with characteristics of the image display panel 40.

In Expression (3) above, CoefV is a coefficient value for the brightness Max(R, G, B) of each of the partial areas. In the present embodiment, the brightness Max(R, G, B) represents a value obtained when 100 [%] is normalized to 1.0.

Figure 15:
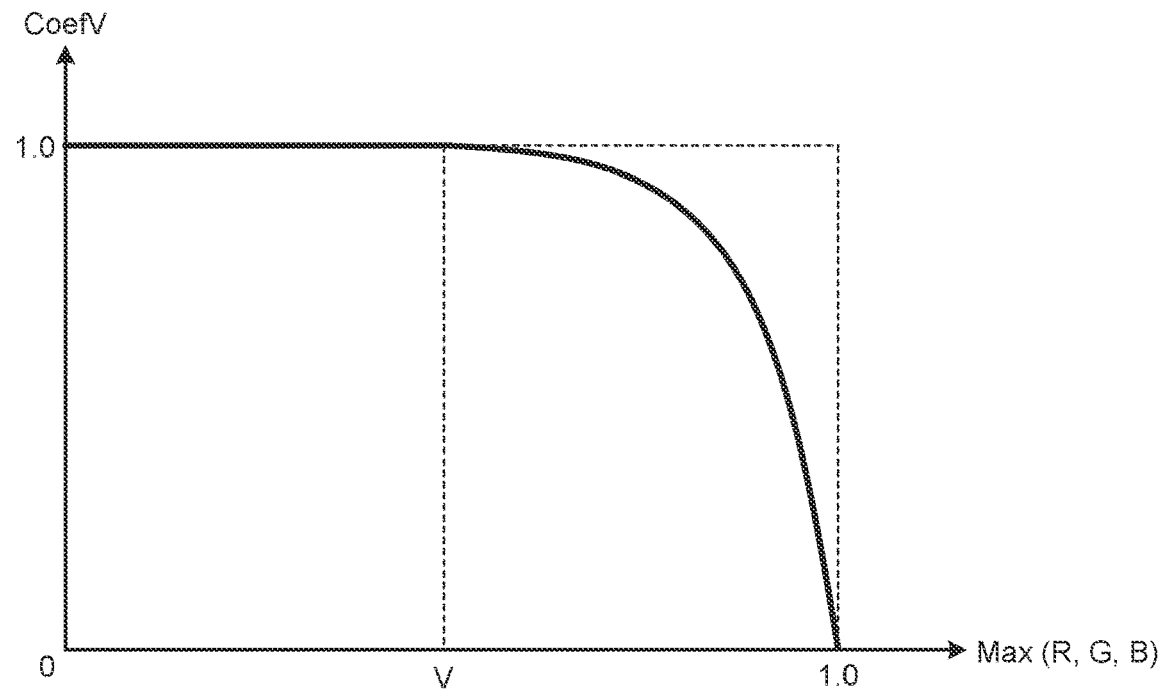
FIG. 15 is a graph illustrating a relation between a coefficient value CoefV and brightness Max(R, G, B)

FIG. 15 is a graph illustrating a relation between the coefficient value CoefV and the brightness Max(R, G, B). In the present embodiment, reference data 22f includes a brightness-and-coefficient map representing the relation between the coefficient value CoefV and the brightness Max(R, G, B) illustrated in FIG. 15.

In FIG. 15, the horizontal axis represents the brightness Max(R, G, B), and the vertical axis represents the coefficient value CoefV. The coefficient value CoefV can have any value between 0 and 1.0 (0≤CoefV≤1.0). The brightness Max(R, G, B) can have any value between 0 and 1.0 (0≤Max(R, G, B)≤1.0). In a range where the value of the brightness Max(R, G, B) is equal to or larger than 0 and smaller than V, the coefficient value CoefV is "1.0". In a range where the value of the brightness Max(R, G, B) is equal to or larger than V and not larger than 1.0, the coefficient value CoefV decreases in a range from 0 to 1.0 as the value of the brightness Max(R, G, B) increases. The value V of the brightness Max(R, G, B) can be set to any value between 0.4 and 0.8 (0.4≤V≤0.8), for example.

The value V of the brightness Max(R, G, B) is merely an example and is not limited to the values cited above.

In Expression (3) above, CoefY is a coefficient value for the luminance Y(R, G, B). In the present embodiment, the luminance Y(R, G, B) represents a value obtained when the luminance Y(R, G, B) of 100% red, 100% green, and 100% blue is normalized to 1.0.

Figure 16:
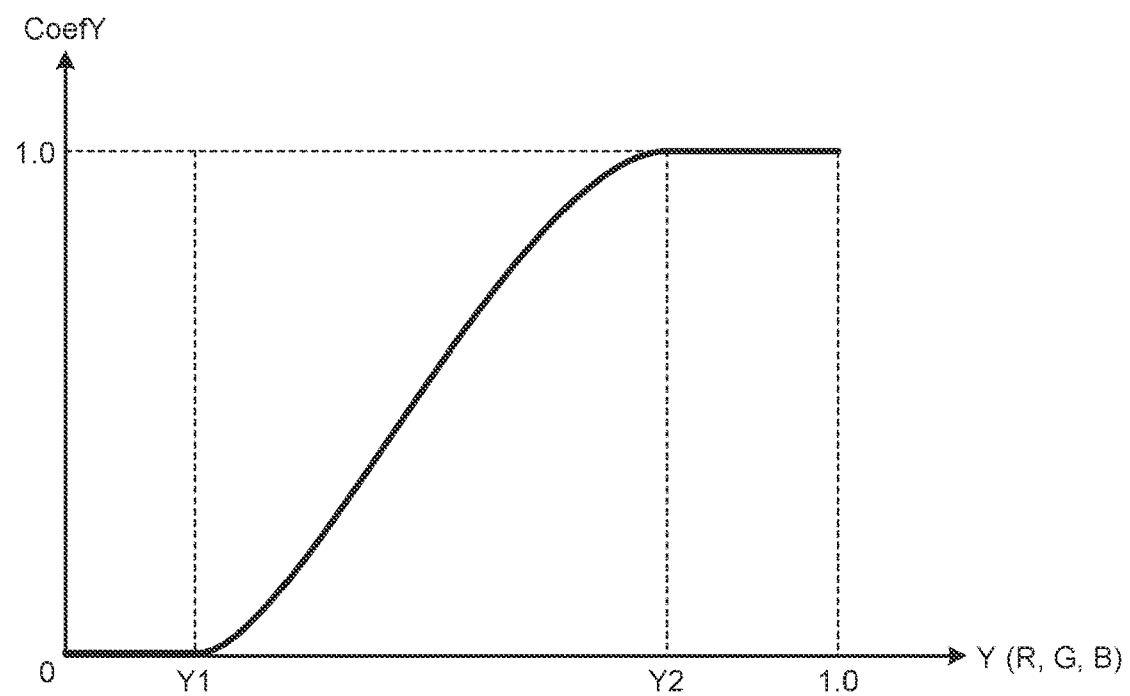
FIG. 16 is a graph illustrating a relation between a coefficient value CoefY and luminance Y(R, G, B)

FIG. 16 is a graph illustrating a relation between the coefficient value CoefY and the luminance Y(R, G, B). In the present embodiment, the reference data 22f includes a luminance-and-coefficient map representing the relation between the coefficient value CoefY and the luminance Y(R, G, B) illustrated in FIG. 16.

In FIG. 16, the horizontal axis represents the luminance Y(R, G, B), and the vertical axis represents the coefficient value CoefY. The coefficient value CoefY can have any value between 0 and 1.0 (0≤CoefY≤1.0). The luminance Y(R, G, B) can have any value between 0 and 1.0 (0≤Y(R, G, B)≤1.0). In a range where the value of the luminance Y(R, G, B) is equal to or larger than 0 and smaller than Y1, the coefficient value CoefY is "0". In a range where the value of the luminance Y(R, G, B) is equal to or larger than Y2 and not larger than 1.0, the coefficient value CoefY is "1.0". In a range where the value of the luminance Y(R, G, B) is equal to or larger than Y1 and smaller than Y2, the coefficient value CoefY decreases as the value of the luminance Y(R, G, B) decreases. The value Y1 of the luminance Y(R, G, B) can be set to any value between 0 and 0.3 (0≤Y1≤0.3), for example. The value Y2 of the luminance Y(R, G, B) can be set to any value between 0.6 and 0.8 (0.6≤Y2≤0.8), for example.

The values Y1 and Y2 of the luminance Y(R, G, B) are merely examples and are not limited to the values cited above.

In the present embodiment, the storage 21c stores discrete data in the form of a data table or an arithmetic expression that traces a brightness-and-coefficient curve (solid line) illustrated in FIG. 15, and discrete data in the form of a data table format or an arithmetic expression that traces a luminance-and-coefficient curve illustrated in FIG. 16.

Figure 17:
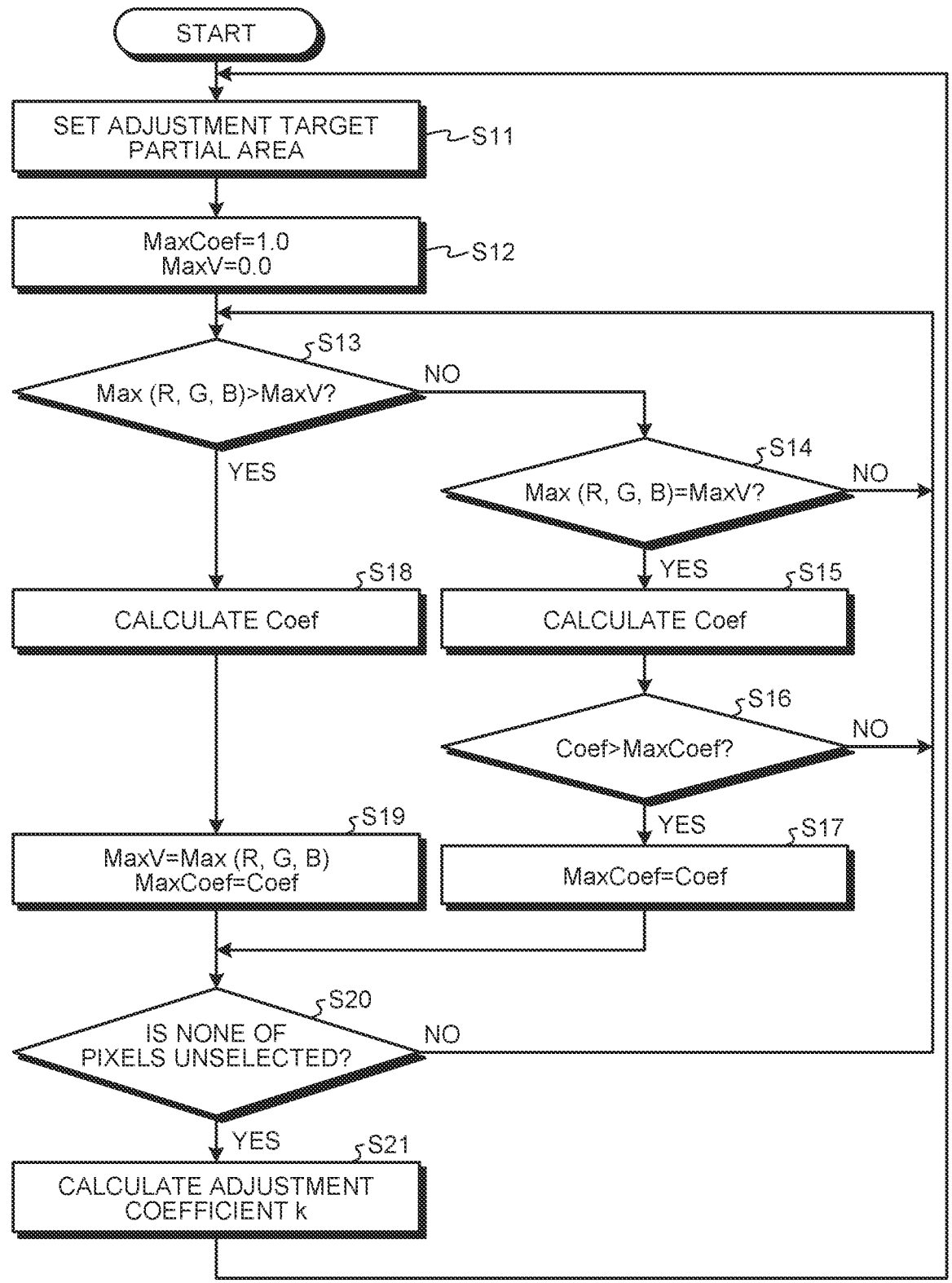
FIG. 17 is a flowchart illustrating an example of adjustment coefficient calculation processing according to a second embodiment of the present disclosure.

The following describes calculation processing of the adjustment coefficient k according to the second embodiment with reference to FIG. 17.

FIG. 17 is a flowchart illustrating an example of the adjustment coefficient calculation processing according to the second embodiment. In the present embodiment, mainly the light quantity adjuster 21b of the light quantity calculator 21 performs the adjustment coefficient calculation processing according to the second embodiment illustrated in FIG. 17.

First, the light quantity adjuster 21b sequentially selects each of the partial areas of the image display surface 41 illustrated in FIG. 3 and sets the selected partial area as the adjustment target partial area (Step S11). The present disclosure is not limited by the selection order of the partial areas.

The light quantity adjuster 21b initially sets a maximum value MaxCoef of the coefficient value Coef in the adjustment target partial area to "1.0", and a maximum value MaxV of the brightness Max(R, G, B) of each of the pixels 48 in the adjustment target partial area to "0.0" (Step S12).

Subsequently, the light quantity adjuster 21b sequentially selects each of the pixels 48 in the adjustment target partial area and determines whether the brightness Max(R, G, B) of the pixel 48 is higher than the maximum value MaxV of the brightness Max(R, G, B) in the adjustment target partial area (Max(R, G, B)>MaxV) (Step S13). The present disclosure is not limited by the selection order of the pixels 48 in the adjustment target partial area.

If the brightness Max(R, G, B) of the selected pixel 48 is equal to or lower than the maximum value MaxV of the brightness Max(R, G, B) in the adjustment target partial area (Max(R, G, B)≤MaxV) (No at Step S13), the light quantity adjuster 21b determines whether the brightness Max(R, G, B) of the pixel 48 is substantially equal to the maximum value MaxV of the brightness Max(R, G, B) (Max(R, G, B)=MaxV) (Step S14). If the brightness Max(R, G, B) of the pixel 48 is lower than the maximum value MaxV of the brightness Max(R, G, B) in the adjustment target partial area (Max(R, G, B)<MaxV) (No at Step S14), the process returns to Step S13 and is repeated from Step S13 for a newly selected one of the pixels 48.

If the brightness Max(R, G, B) of the pixel 48 is substantially equal to the maximum value MaxV of the brightness Max(R, G, B) in the adjustment target partial area (Yes at Step S14), the light quantity adjuster 21b uses Expression (3) given above to calculate the coefficient value Coef (Step S15).

Subsequently, the light quantity adjuster 21b determines whether the coefficient value Coef calculated at Step S15 is larger than the maximum value MaxCoef of the coefficient value Coef in the adjustment target partial area (Coef>MaxCoef) (Step S16).

If the coefficient value Coef calculated at Step S15 is equal to or smaller than the maximum value MaxCoef of the coefficient value Coef in the adjustment target partial area (Coef≤MaxCoef) (No at Step S16), the process returns to Step S13 and is repeated from Step S13 for a newly selected one of the pixels 48.

If the coefficient value Coef calculated at Step S15 is larger than the maximum value MaxCoef of the coefficient value Coef in the adjustment target partial area (Coef>MaxCoef) (Yes at Step S16), the light quantity adjuster 21b sets the coefficient value Coef as the maximum value MaxCoef of the coefficient value Coef in the adjustment target partial area (Step S17).

If the brightness Max(R, G, B) of the selected pixel 48 is higher than the maximum value MaxV of the brightness Max(R, G, B) in the adjustment target partial area (Max(R, G, B)>MaxV) (Yes at Step S13), the light quantity adjuster 21b uses Expression (3) given above to calculate the coefficient value Coef (Step S18). Then, the light quantity adjuster 21b sets the coefficient value Coef as the maximum value MaxCoef of the coefficient value Coef in the adjustment target partial area, and sets the brightness Max(R, G, B) of the selected pixel 48 as the maximum value MaxV of the brightness Max(R, G, B) in the adjustment target partial area (Step S19).

The light quantity adjuster 21b determines whether none of the pixels 48 in the adjustment target partial area is unselected (Step S20). If any of the pixels 48 is unselected (No at Step S20), the process returns to Step S13 and is repeated from Step S13 for a newly selected one of the pixels 48.

If none of the pixels 48 is unselected (Yes at Step S20), the light quantity adjuster 21b uses Expression (2) given above to calculate the adjustment coefficient k for the light quantity of the adjustment target partial area (Step S21), and the process returns to Step S11 to set a new adjustment target partial area.

The above-described adjustment coefficient calculation processing can, for example, reduce the value of the adjustment coefficient k as the value of the luminance Y(R, G, B) in the bright area 41b illustrated in FIG. 9 decreases. As a result, when, for example, the visual luminance of the bright area 41b is higher as illustrated in FIG. 13, the black floating 42 in the dark area 41a around the bright area 41b that would be caused by the halo effect can be effectively reduced. In addition, for example, the value of the adjustment coefficient k can be reduced as the value of the brightness Max(R, G, B) in the bright area 41b illustrated in FIG. 9 increases. As a result, for example, as illustrated in FIG. 14, the black floating 42 in the dark area 41a around the bright area 41b that would be caused by the halo effect can be effectively reduced even when the brightness of the bright area 41b is lower.

Modification

Figure 18:
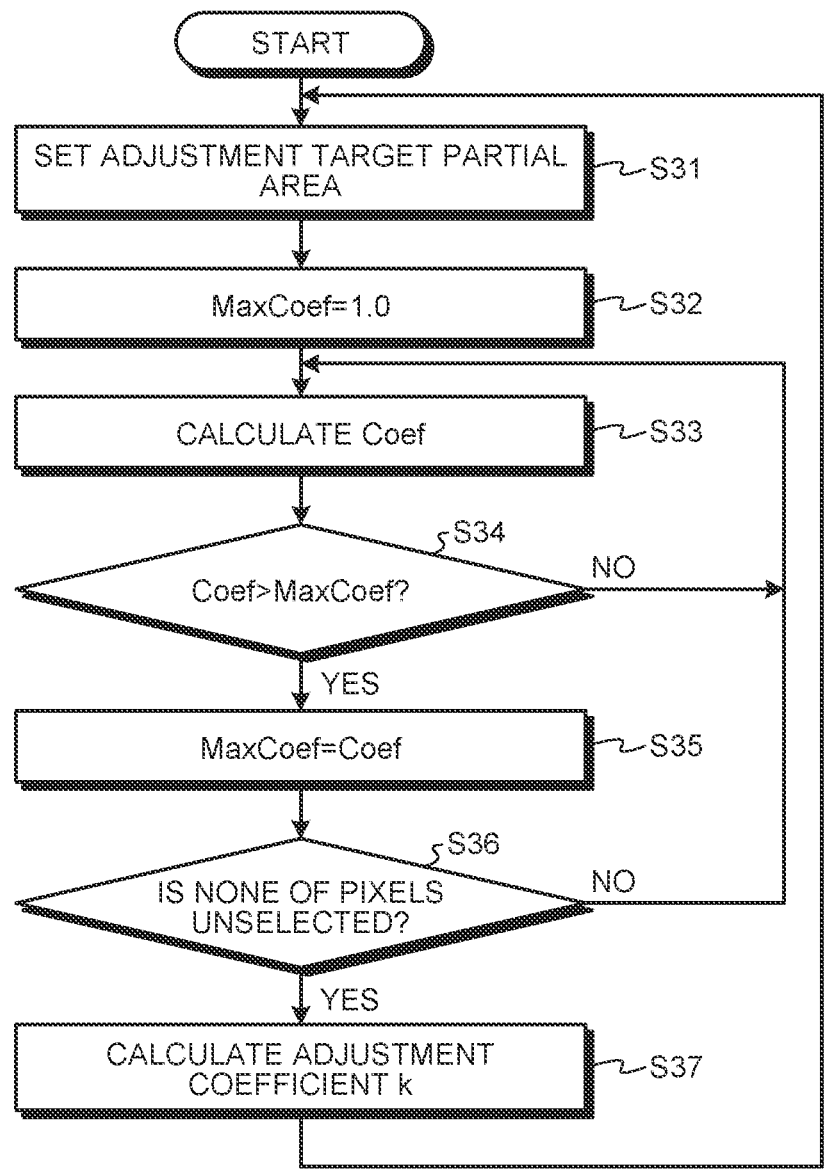
FIG. 18 is a flowchart illustrating an example of the adjustment coefficient calculation processing according to a modification of the second embodiment.

FIG. 18 is a flowchart illustrating an example of the adjustment coefficient calculation processing according to a modification of the second embodiment. In the present embodiment, mainly the light quantity adjuster 21b of the light quantity calculator 21 performs the adjustment coefficient calculation processing according to the modification of the second embodiment illustrated in FIG. 18.

First, the light quantity adjuster 21b sequentially selects each of the partial areas of the image display surface 41 illustrated in FIG. 3 and sets the selected partial area as the adjustment target partial area (Step S31). The present disclosure is not limited by the selection order of the partial areas.

The light quantity adjuster 21b initially sets the maximum value MaxCoef of the coefficient value Coef in the adjustment target partial area to "1.0" (Step S32). Subsequently, the light quantity adjuster 21b sequentially selects each of the pixels 48 in the adjustment target partial area and uses Expression (3) given above to calculate the coefficient value Coef (Step S33).

Subsequently, the light quantity adjuster 21b determines whether the coefficient value Coef calculated at Step S32 is larger than the maximum value MaxCoef of the coefficient value Coef in the adjustment target partial area (Coef>MaxCoef) (Step S34).

If the coefficient value Coef calculated at Step S33 is equal to or smaller than the maximum value MaxCoef of the coefficient value Coef in the adjustment target partial area (Coef≤MaxCoef) (No at Step S34), the process returns to Step S33 and is repeated from Step S33 for a newly selected one of the pixels 48.

If the coefficient value Coef calculated at Step S33 is larger than the maximum value MaxCoef of the coefficient value Coef in the adjustment target partial area (Coef>MaxCoef) (Yes at Step S34), the light quantity adjuster 21b sets the coefficient value Coef as the maximum value MaxCoef of the coefficient value Coef in the adjustment target partial area (Step S35).

The light quantity adjuster 21b determines whether none of the pixels 48 in the adjustment target partial area is unselected (Step S36). If any of the pixels 48 is unselected (No at Step S36), the process returns to Step S33 and is repeated from Step S33 for a newly selected one of the pixels 48.

If none of the pixels 48 is unselected (Yes at Step S36), the light quantity adjuster 21b uses Expression (2) given above to calculate the adjustment coefficient k for the light quantity of the adjustment target partial area (Step S37), and the process returns to Step S31 to set a new adjustment target partial area.

Also in the modification of the second embodiment, the above-described adjustment coefficient calculation processing can, for example, reduce the value of the adjustment coefficient k as the value of the luminance Y(R, G, B) in the bright area 41b illustrated in FIG. 9 decreases. As a result, when, for example, the visual luminance of the bright area 41b is higher as illustrated in FIG. 13, the black floating 42 in the dark area 41a around the bright area 41b that would be caused by the halo effect can be effectively reduced. In addition, for example, the value of the adjustment coefficient k can be reduced as the value of the brightness Max(R, G, B) in the bright area 41b illustrated in FIG. 9 increases. As a result, for example, as illustrated in FIG. 14, the black floating 42 in the dark area 41a around the bright area 41b that would be caused by the halo effect can be effectively reduced even when the brightness of the bright area 41b is lower.

As described above, according to the second embodiment and the modification of the second embodiment, the display device 10 calculates the adjustment coefficient k in accordance with the luminance Y(R, G, B) and the brightness Max(R, G, B) of the input image signals for each of the partial areas and uses the calculated adjustment coefficient k to correct the light quantity of the adjustment target partial area. This processing can effectively reduce the black floating in the dark area around the bright area that would be caused by the halo effect.

As described above, in the second embodiment, the controller 11 reduces the adjustment coefficient k as the brightness of the input image signals corresponding to the adjustment target partial area increases. This processing can effectively reduce the black floating in the dark area that would be caused by the halo effect when the luminance of the bright area is higher.

The controller 11 also reduces the adjustment coefficient k as the visual luminance of the input image signals corresponding to the adjustment target partial area decreases. This processing can effectively reduce the black floating in the dark area that would be caused by the halo effect even when the brightness of the bright area is lower.

According to the present embodiment, the display device 10 can be obtained that reduces the black floating in the dark area that would be caused by the halo effect.

Third Embodiment

FIG. 19 is a schematic diagram illustrating the image display surface of the display device according to a third embodiment of the present disclosure. In the present embodiment, as illustrated in FIG. 19, the image display surface 41 is divided into eight equal parts of $X_1, X_2, \ldots,$ and $X_8$ along the X-direction and divided into two equal parts of $Y_a$ and $Y_b$ along the Y-direction, and thereby, 8×2 partial areas are provided. When, as an example, 800 pixels 48 are arranged in the X-direction and 480 pixels 48 are arranged in the Y-direction, that is, 800×480 pixels 48 are arranged in a matrix (row-column configuration) on the image display surface 41, each of the partial areas illustrated in FIG. 19 includes 100×240 pixels 48. The division example of the image display surface 41 illustrated in FIG. 19 and the number of the pixels on the image display surface 41 are merely examples. The division example and the number of the pixels on the image display surface 41 are not limited thereto and can be changed as appropriate.

FIG. 20 is a diagram illustrating the light-emitting area according to the third embodiment. FIG. 20 illustrates an example in which one light source 6a is disposed corresponding to each of the partial areas of the image display surface 41 illustrated in FIG. 19. As is the case with the light source 6a described in the first embodiment, a light source 6b is, for example, a light-emitting diode (LED), which is, however, a mere specific example of the light source 6b. The light source 6b is not limited to this example and can be changed as appropriate to, for example, a micro LED or a mini LED.

In the example illustrated in FIG. 20, as an aspect, a light guide plate (not illustrated) is provided in the light-emitting area 61 to guide the light of the light sources 6b toward the image display surface 41. FIG. 20 illustrates the example in which the light sources 6b are disposed one on a lateral side of each of the partial areas on both sides in the Y-direction of the light-emitting area 61. However, the configuration is not limited to this arrangement as long as the light quantity can be individually controlled for each of the partial areas and the light quantity of each of the partial areas is controllable. The configuration can be changed as appropriate.

Also in the configuration illustrated in FIGS. 19 and 20, performing the same processing as that of the above-described first and second embodiments can reduce the black floating in the dark area that would be caused by the halo effect.

Specifically, the light quantity adjustment processing (refer to FIGS. 11A to 11C) described in the first embodiment can reduce the light quantity of the bright area adjacent to the dark area. As a result, the black floating in the dark area around the bright area that would be caused by the halo effect can be reduced.

Specifically, the adjustment coefficient calculation processing (refer to FIG. 17) described in the second embodiment or the adjustment coefficient calculation processing (refer to FIG. 18) described in the modification of the second embodiment can reduce the value of the adjustment coefficient k as the value of the luminance Y(R, G, B) of the bright area increases. This processing can effectively reduce the black floating in the dark area around the bright area that would be caused by the halo effect when the visual luminance is higher in the bright area. The value of the adjustment coefficient k can also be reduced as the value of the brightness Max(R, G, B) of the bright area increases. This processing can effectively reduce the black floating in the dark area around the bright area that would be caused by the halo effect even when the brightness of the bright area is lower.

While the preferred embodiments of the present disclosure have been described above, the present disclosure is not limited to the embodiments described above. The content disclosed in the embodiments is merely exemplary, and can be variously changed within the scope not departing from the gist of the present disclosure. Any modification appropriately made within the scope not departing from the gist of the present disclosure also naturally belongs to the technical scope of the present disclosure.

What is claimed is:

1. A display device comprising:
   an image display panel having an image display surface on which display is to be controlled based on an image signal;
   a light source device that comprises a plurality of light sources provided corresponding to a plurality of divided partial areas of the image display surface, and is configured to illuminate the image display surface; and
   a signal processor configured to calculate a light quantity of each light source for each of the partial areas, wherein
   the signal processor is configured to calculate the light quantity for each partial area based on the image signal, set one of the partial areas as an adjustment target partial area for the light quantity, and adjust the light quantity in the adjustment target partial area when the light quantity of an adjacent partial area located around the adjustment target partial area is equal to or smaller than a predetermined value,
   the signal processor is configured to
      sequentially select each of the divided partial areas of the image display surface to set the selected one of the divided partial areas as the adjustment target partial area for the light quantity,
      sequentially select each of a plurality of the adjacent partial areas for the selected one of the divided partial areas,
      determine whether any unselected adjacent partial area is present for the selected divided partial area,
      select, when any unselected adjacent partial area is present, an unselected adjacent partial area of the adjacent partial areas, and
      select, when no unselected adjacent partial area is present, an unselected divided partial area as a new adjustment target partial area, and the signal processor is configured to reduce an adjustment coefficient only as a value of brightness of the image signal corresponding to the adjustment target partial area increases.

2. The display device according to claim 1, wherein the signal processor is configured to adjust the light quantity in the adjustment target partial area by multiplying the light quantity in the adjustment target partial area by the adjustment coefficient having a value equal to or smaller than 1.

3. The display device according to claim 2, wherein the signal processor is configured to reduce the adjustment coefficient as luminance of the image signal corresponding to the adjustment target partial area decreases.

4. The display device according to claim 1, wherein the light source device is provided with the light sources that face the partial areas.

5. The display device according to claim 1, wherein the light source device is provided with the light sources on lateral sides of the partial areas.

6. A display device comprising:
an image display panel having an image display surface on which display is to be controlled based on an image signal;
a light source device that comprises a plurality of light sources provided corresponding to a plurality of divided partial areas of the image display surface, and is configured to illuminate the image display surface; and
a signal processor configured to calculate a light quantity of each light source for each of the partial areas, wherein
the signal processor is configured to calculate the light quantity for each partial area based on the image signal, set one of the partial areas as an adjustment target partial area for the light quantity, and adjust the light quantity in the adjustment target partial area when a difference value obtained by subtracting the light quantity of an adjacent partial area located around the adjustment target partial area from the light quantity of the adjustment target partial area is equal to or greater than a predetermined value,
the signal processor is configured to
sequentially select each of the divided partial areas of the image display surface to set the selected one of the divided partial areas as the adjustment target partial area for the light quantity,
sequentially select each of a plurality of the adjacent partial areas for the selected one of the divided partial areas,
determine whether any unselected adjacent partial area is present for the selected divided partial area,
select, when any unselected adjacent partial area is present, an unselected adjacent partial area of the adjacent partial areas, and
select, when no unselected adjacent partial area is present, an unselected divided partial area as a new adjustment target partial area, and
the signal processor is configured to reduce an adjustment coefficient only as a value of brightness of the image signal corresponding to the adjustment target partial area increases.

7. The display device according to claim 6, wherein the signal processor is configured to adjust the light quantity in the adjustment target partial area by multiplying the light quantity in the adjustment target partial area by the adjustment coefficient having a value equal to or smaller than 1.

8. The display device according to claim 7, wherein the signal processor is configured to reduce the adjustment coefficient as luminance of the image signal corresponding to the adjustment target partial area decreases.

9. The display device according to claim 6, wherein the light source device is provided with the light sources that face the partial areas.

10. The display device according to claim 6, wherein the light source device is provided with the light sources on lateral sides of the partial areas.

11. A display device comprising:
an image display panel having an image display surface on which display is to be controlled based on an image signal;
a light source device that comprises a plurality of light sources provided corresponding to a plurality of divided partial areas of the image display surface, and is configured to illuminate the image display surface; and
a signal processor configured to calculate a light quantity of each light source for each of the partial areas, wherein
the signal processor is configured to calculate the light quantity for each partial area based on the image signal, set one of the partial areas as an adjustment target partial area for the light quantity, and adjust the light quantity in the adjustment target partial area when the light quantity of an adjacent partial area located around the adjustment target partial area is equal to or smaller than a predetermined value, or when a difference value obtained by subtracting the light quantity of an adjacent partial area located around the adjustment target partial area from the light quantity of the adjustment target partial area is equal to or greater than a predetermined value,
the signal processor is configured to
sequentially select each of the divided partial areas of the image display surface to set the selected one of the divided partial areas as the adjustment target partial area for the light quantity,
sequentially select each of a plurality of the adjacent partial areas for the selected one of the divided partial areas,
determine whether any unselected adjacent partial area is present for the selected divided partial area,
select, when any unselected adjacent partial area is present, an unselected adjacent partial area of the adjacent partial areas, and
select, when no unselected adjacent partial area is present, an unselected divided partial area as a new adjustment target partial area, and
the signal processor is configured to reduce an adjustment coefficient only as a value of brightness of the image signal corresponding to the adjustment target partial area increases.

12. The display device according to claim 11, wherein the signal processor is configured to adjust the light quantity in the adjustment target partial area by multiplying the light quantity in the adjustment target partial area by the adjustment coefficient having a value equal to or smaller than 1.

13. The display device according to claim 12, wherein the signal processor is configured to reduce the adjustment coefficient as luminance of the image signal corresponding to the adjustment target partial area decreases.

14. The display device according to claim 11, wherein the light source device is provided with the light sources that face the partial areas.

15. The display device according to claim 11, wherein the light source device is provided with the light sources on lateral sides of the partial areas.

16. A display device comprising:
an image display panel configured to display an image based on an image signal; and
a light source device having a first divided area and a second divided area adjacent to the first divided area that face an image display surface of the image display panel, wherein the image display panel is configured to calculate a light quantity of the first divided area and a light quantity of the second divided area based on the image signals, and reduce the light quantity of the first divided area when the light quantity of the second divided area is equal to or smaller than a predetermined value,
the light source device has a plurality of the first divided areas and a plurality of the second divided areas for each of the first divided areas,
the image display panel is configured to
sequentially select each of the first divided areas to perform light quantity adjustment,
sequentially select each of a plurality of the second divided areas for the selected one of the first divided areas,
determine whether any unselected second divided area is present for the selected first divided area,
select an unselected second divided area of the second divided areas when any unselected second divided area is present, and
select an unselected first divided area when no unselected second divided area is present, and
the signal processor is configured to reduce an adjustment coefficient only as a value of brightness of the image signal corresponding to the first divided area increases.

17. The display device according to claim 16, wherein the image display panel is configured to light the first divided area at a light quantity obtained by multiplying the light quantity of the first divided area by the adjustment coefficient having a value equal to or smaller than 1.

18. The display device according to claim 17, wherein the image display panel is configured to reduce the adjustment coefficient as luminance of the image signal corresponding to the first divided area decreases.

19. The display device according to a claim 16, wherein the light source device is provided with light sources that face the first divided area and the second divided area.

20. The display device according to claim 16 wherein the light source device is provided with light sources on lateral sides of the first divided area and the second divided area.

21. A display device comprising:
an image display panel configured to display an image based on an image signal; and
a light source device having a first divided area and a second divided area adjacent to the first divided area that face an image display surface of the image display panel, wherein the image display panel is configured to calculate a light quantity of the first divided area and a light quantity of the second divided area based on the image signals, and reduce the light quantity of the first divided area when the light quantity of the first divided area is larger than the light quantity of the second divided area by a predetermined value or more,
the light source device has a plurality of the first divided areas and a plurality of the second divided areas for each of the first divided areas,
the image display panel is configured to
sequentially select each of the first divided areas to perform light quantity adjustment,
sequentially select each of a plurality of the second divided areas for the selected one of the first divided areas,
determine whether any unselected second divided area is present for the selected first divided area,
select an unselected second divided area of the second divided areas when any unselected second divided area is present, and
select an unselected first divided area when no unselected second divided area is present, and
the signal processor is configured to reduce an adjustment coefficient only as a value of brightness of the image signal corresponding to the adjustment target partial first divided area increases.

22. The display device according to claim 21, wherein the image display panel is configured to light the first divided area at a light quantity obtained by multiplying the light quantity of the first divided area by the adjustment coefficient having a value equal to or smaller than 1.

23. The display device according to claim 22, wherein the image display panel is configured to reduce the adjustment coefficient as luminance of the image signal corresponding to the first divided area decreases.

24. The display device according to claim 21, wherein the light source device is provided with light sources that face the first divided area and the second divided area.

25. The display device according to claim 21, wherein the light source device is provided with light sources on lateral sides of the first divided area and the second divided area.

26. A display device comprising:
an image display panel configured to display an image based on an image signal; and
a light source device having a first divided area and a second divided area adjacent to the first divided area that face an image display surface of the image display panel, wherein
the image display panel is configured to calculate a light quantity of the first divided area and a light quantity of the second divided area based on the image signals, and reduce the light quantity of the first divided area when the light quantity of the second divided area is equal to or smaller than a predetermined value, or when the light quantity of the first divided area is larger than the light quantity of the second divided area by a predetermined value or more,
the light source device has a plurality of the first divided areas and a plurality of the second divided areas for each of the first divided areas,
the image display panel is configured to
sequentially select each of the first divided areas to perform light quantity adjustment,
sequentially select each of a plurality of the second divided areas for the selected one of the first divided areas,
determine whether any unselected second divided area is present for the selected first divided area,
select an unselected second divided area of the second divided areas when any unselected second divided area is present, and
select an unselected first divided area when no unselected second divided area is present, and
the signal processor is configured to reduce an adjustment coefficient only as a value of brightness of the image signal corresponding to the adjustment target partial first divided area increases.

27. The display device according to claim 26, wherein the image display panel is configured to light the first divided area at a light quantity obtained by multiplying the light quantity of the first divided area by the adjustment coefficient having a value equal to or smaller than 1.

28. The display device according to claim 27, wherein the image display panel is configured to reduce the adjustment coefficient as luminance of the image signal corresponding to the first divided area decreases.

29. The display device according to claim 26, wherein the light source device is provided with light sources that face the first divided area and the second divided area.

30. The display device according to claim 26, wherein the light source device is provided with light sources on lateral sides of the first divided area and the second divided area.

* * * * *